United States Patent
Takai et al.

(10) Patent No.: US 12,459,688 B2
(45) Date of Patent: Nov. 4, 2025

(54) TOFU PACKING DEVICE

(71) Applicant: TAKAI TOFU & SOYMILK EQUIPMENT CO., Ishikawa (JP)

(72) Inventors: Toichiro Takai, Ishikawa (JP); Masahide Takeda, Ishikawa (JP); Kazuyuki Shiga, Ishikawa (JP)

(73) Assignee: TAKAI TOFU & SOYMILK EQUIPMENT CO., Ishikawa (JP)

( * ) Notice: Subject to any disclaimer, the term of this patent is extended or adjusted under 35 U.S.C. 154(b) by 668 days.

(21) Appl. No.: 17/788,703

(22) PCT Filed: Dec. 25, 2020

(86) PCT No.: PCT/JP2020/049022
§ 371 (c)(1),
(2) Date: Jun. 23, 2022

(87) PCT Pub. No.: WO2021/132685
PCT Pub. Date: Jul. 1, 2021

(65) Prior Publication Data
US 2023/0027134 A1    Jan. 26, 2023

(30) Foreign Application Priority Data
Dec. 26, 2019    (JP) .................................. 2019-236830

(51) Int. Cl.
*B65B 25/00* (2006.01)
*B65B 25/06* (2006.01)
(Continued)

(52) U.S. Cl.
CPC ............ *B65B 25/001* (2013.01); *B65B 25/06* (2013.01); *B65B 35/02* (2013.01); *B65B 43/52* (2013.01); *B65B 57/08* (2013.01); *B65B 57/16* (2013.01)

(58) Field of Classification Search
CPC ......... B65B 43/46; B65B 43/52; B65B 57/08; B65B 57/16; B65B 57/14; B65B 35/02;
(Continued)

(56) References Cited

U.S. PATENT DOCUMENTS 5,230,201 A    7/1993    Iuchi et al.
2010/0269453 A1*  10/2010    Takai ...................... A23L 11/45
                                                                53/391

(Continued)

FOREIGN PATENT DOCUMENTS

CN    102715445 A    10/2012
DE    19808791 A1 *  9/1999
(Continued)

OTHER PUBLICATIONS

Translation of JP 2007006759 A (Year: 2007).*
(Continued)

*Primary Examiner* — Thomas M Wittenschlaeger
(74) *Attorney, Agent, or Firm* — Studebaker Brackett PLLC

(57) ABSTRACT

A tofu packing device includes a pack covering device and a pack supply device. The pack covering device is configured to cover a plurality of cakes of tofu with packs in a state in which the packs are upside down, the plurality of cakes of tofu being aligned at predetermined intervals in front, rear, left and right directions on a conveying surface of a transfer conveyor. The pack supply device is configured to continuously supply the packs to the pack covering device from a lateral side of the transfer conveyor.

10 Claims, 22 Drawing Sheets

(51) Int. Cl.
   *B65B 35/02* (2006.01)
   *B65B 43/52* (2006.01)
   *B65B 57/08* (2006.01)
   *B65B 57/16* (2006.01)

(58) Field of Classification Search
   CPC ....... B65B 35/24; B65B 25/06; B65B 25/001; B65B 65/006; B26D 9/00; B26D 1/14; B26D 1/08; B26D 2210/02; B65G 47/248; A23L 11/45
   See application file for complete search history.

(56) References Cited

U.S. PATENT DOCUMENTS

| | | | |
|---|---|---|---|
| 2019/0100339 A1 | 4/2019 | Tanoue et al. | |
| 2019/0152635 A1 | 5/2019 | Morino et al. | |
| 2021/0094716 A1* | 4/2021 | Showman | B31B 50/005 |

FOREIGN PATENT DOCUMENTS

| | | | |
|---|---|---|---|
| GB | 2102758 A | * | 2/1983 |
| JP | S61-000113 A | | 1/1986 |
| JP | S61-203318 A | | 9/1986 |
| JP | S63-216446 A | | 9/1988 |
| JP | H02-152605 A | | 6/1990 |
| JP | H04-65702 U | | 6/1992 |
| JP | 2006001598 A | * | 1/2006 |
| JP | 2007006759 A | * | 1/2007 |
| JP | 2014-226759 A | | 12/2014 |
| JP | 2015-227204 A | | 12/2015 |
| JP | 2018-177339 A | | 11/2018 |
| JP | 2019-094151 A | | 6/2019 |
| WO | 2009/150756 A1 | | 12/2009 |

OTHER PUBLICATIONS

Translation of DE 19808791 A1 (Year: 1999).*
Translation of GB 2102758 A (Year: 1983).*
Translation of JP 2006001598 A (Year: 2006).*
International Search Report issued in PCT/JP2020/049022; mailed Feb. 22, 2021.
Written Opinion issued in PCT/JP2020/049022; mailed Feb. 22, 2021.
An Office Action; "Notice of Reasons for Refusal," mailed by the Japanese Patent Office on Sep. 5, 2023, which corresponds to Japanese Patent Application No. 2022-210369 and is related to U.S. Appl. No. 17/788,703; with English language translation.
An Office Action mailed by the Korean Intellectual Property Office on Oct. 17, 2024, which corresponds to Korean Patent Application No. 10-2022-7021158 and is related to U.S. Appl. No. 17/788,703; with English language translation.
An Office Action mailed by China National Intellectual Property Administration on Mar. 13, 2025, which corresponds to Chinese Patent Application No. 2020800900634 and is related to U.S. Appl. No. 17/788,703; with English language translation.

* cited by examiner

FIG. 3
(a)
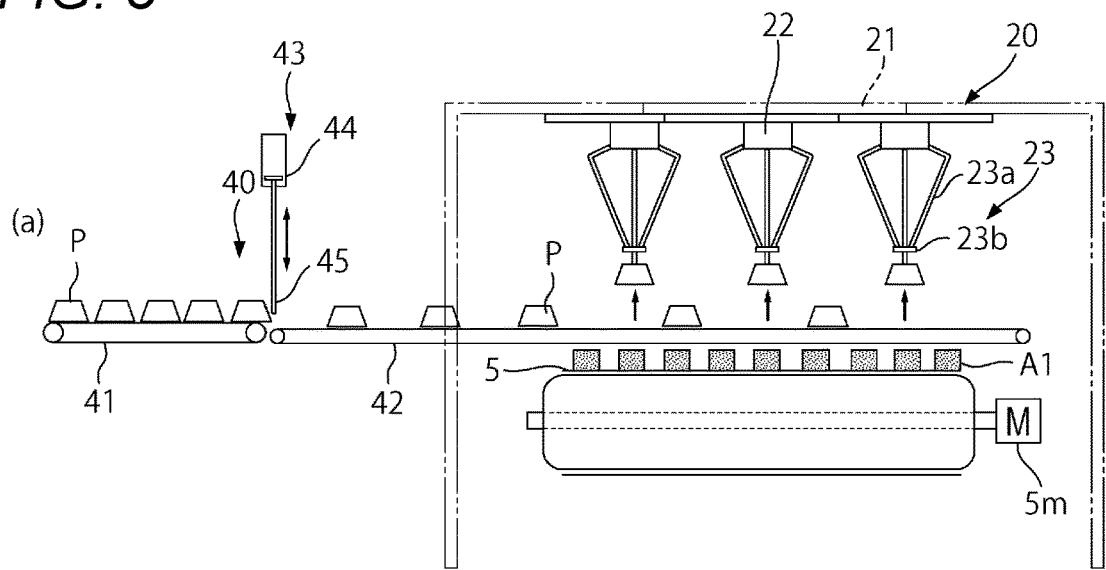
(b)
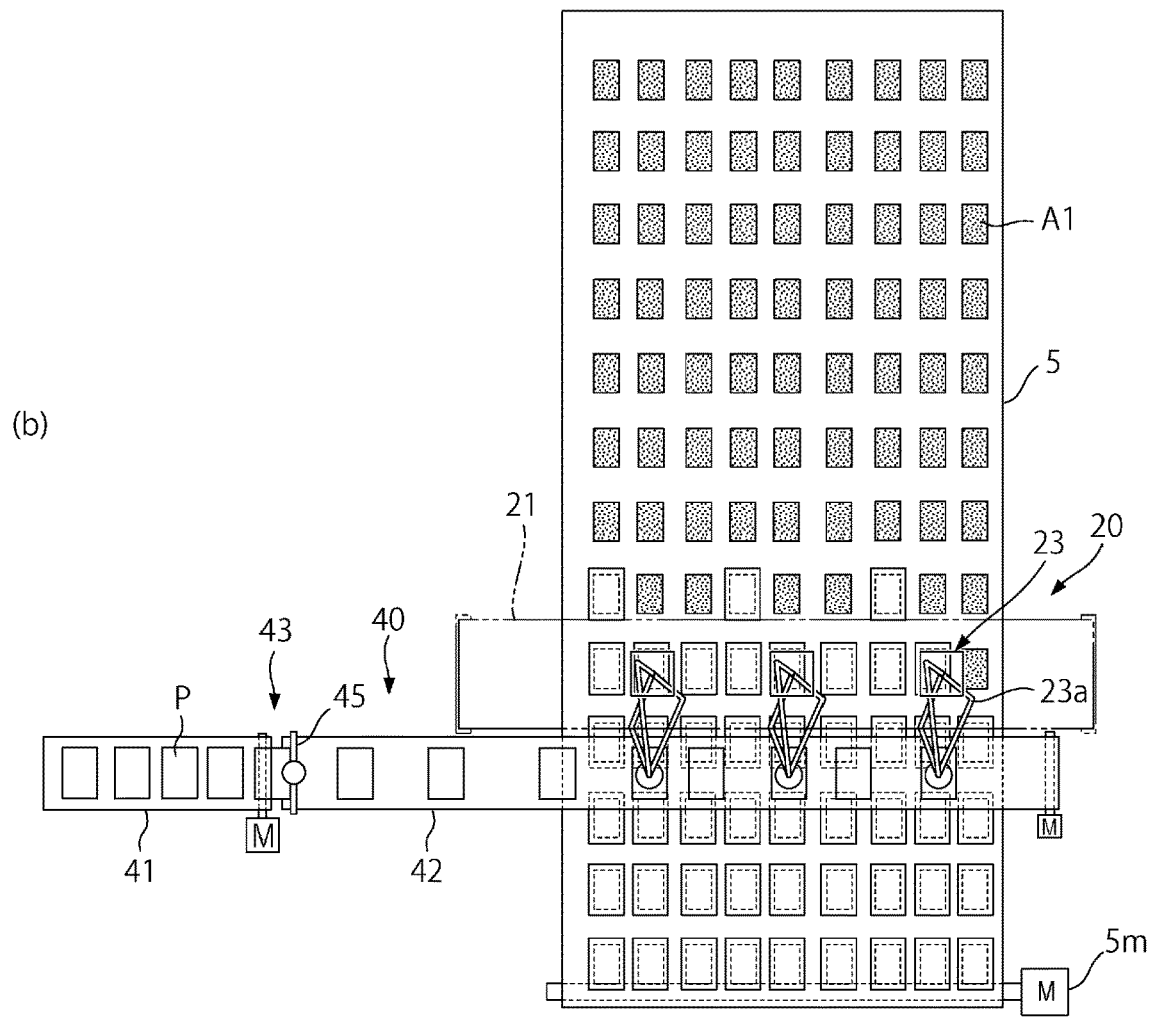

FIG. 4
(a)
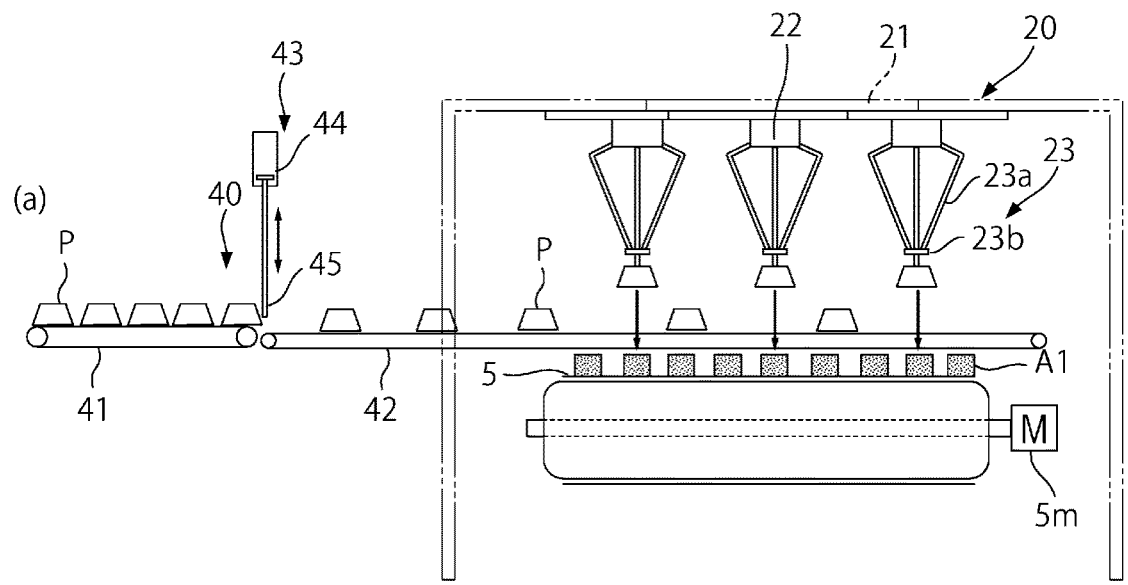
(b)
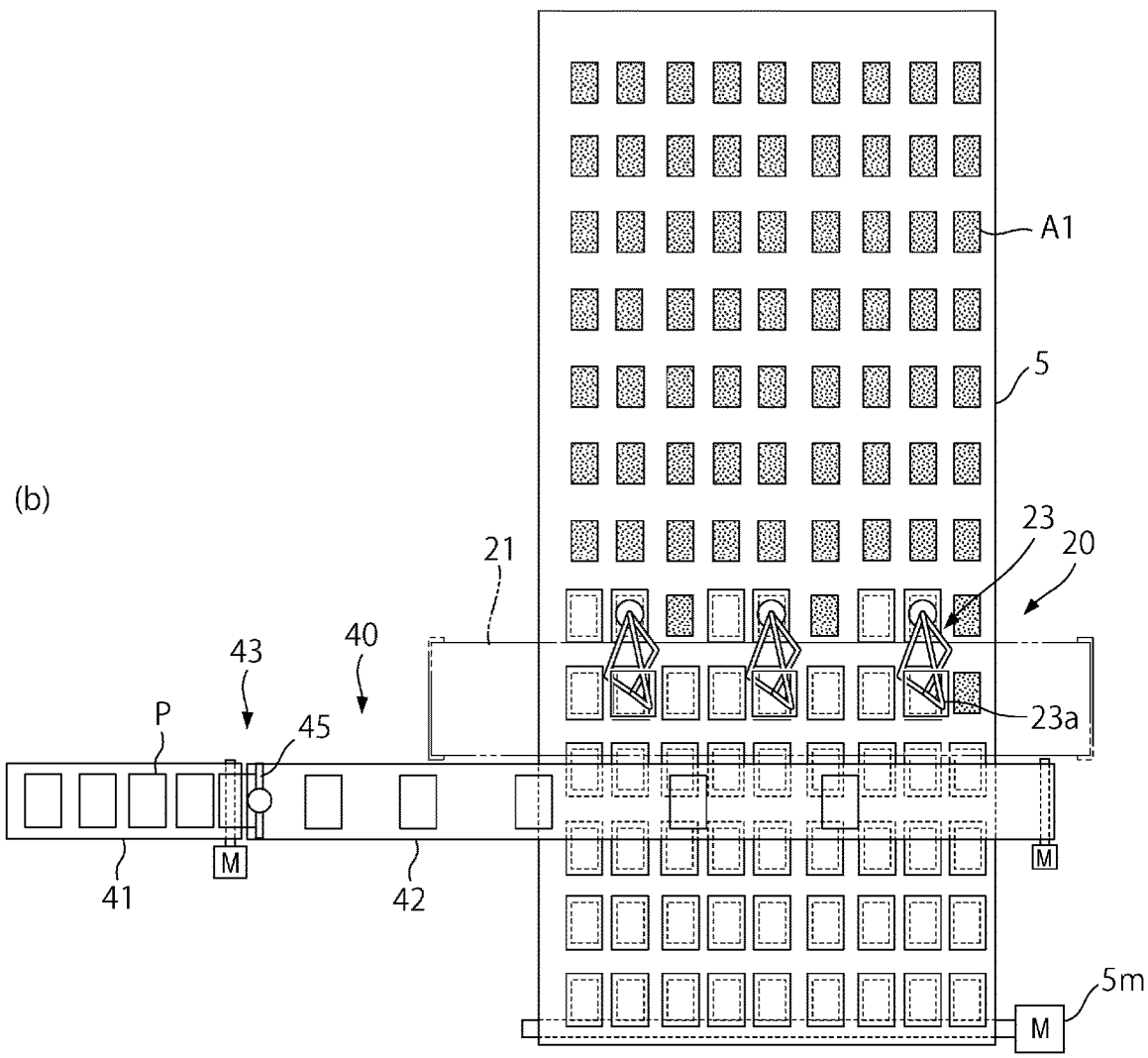

FIG. 16
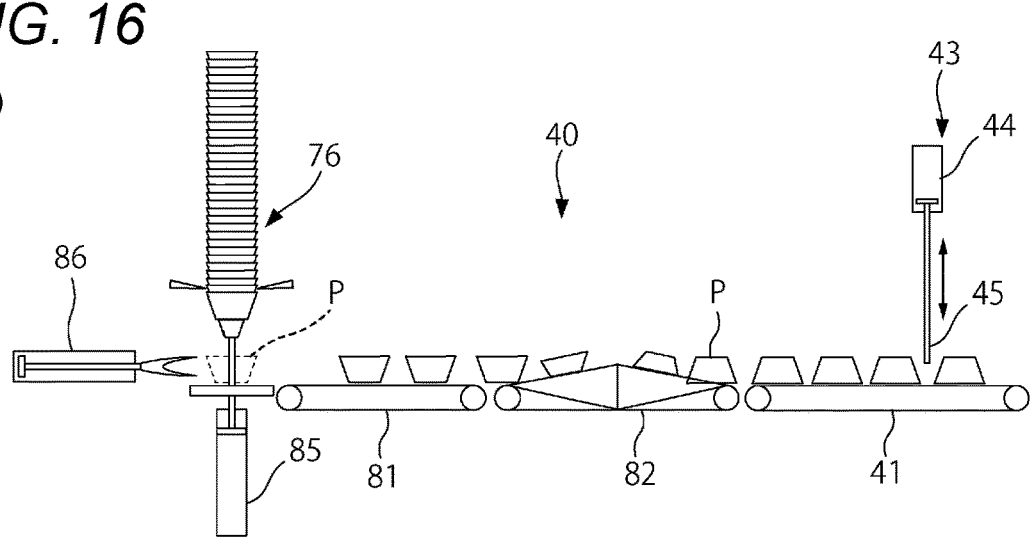
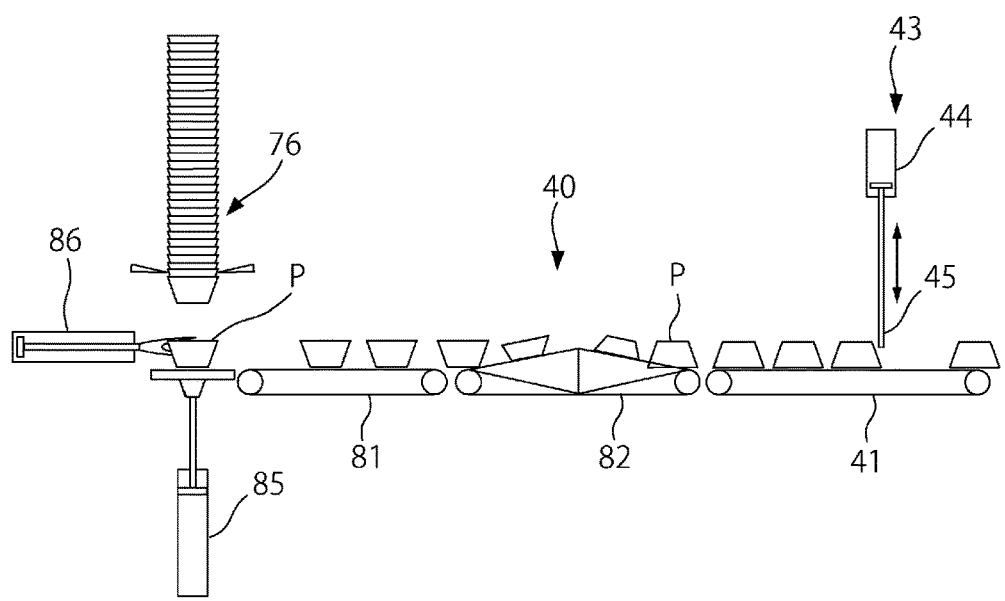
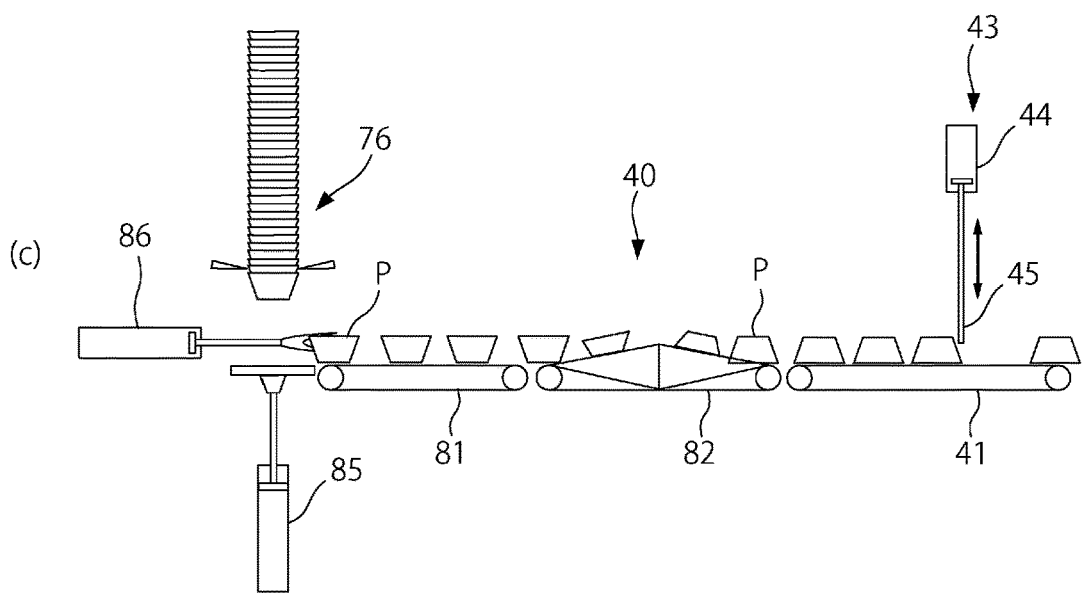

TOFU PACKING DEVICE

TECHNICAL FIELD

The present invention relates to a tofu packing device that continuously and automatically performs cutting to packing of sheet-shaped tofu which is continuously manufactured.

BACKGROUND ART

In general, tofu is produced by, after coagulating and ripening soymilk as a raw material in a mold in a state where a coagulant is added to the soymilk in a case of silken tofu, or after coagulating and ripening soymilk in an appropriate container (for example, a tub, a bucket, a mold, or the like) in the same manner and pouring the curd into a mold to press and shape the curd in a case of firm tofu, taking out the curd from the molds, cutting the curd into a predetermined size, and packing.

In recent years, the number of continuous mass production lines has increased. In the continuous mass production line, sheet-shaped silken tofu continuously coagulated and ripened or firm tofu obtained by crushing the silken tofu and continuously pressing and shaping the crushed silken tofu is cut out into cakes one by one, and each of the cakes of tofu is packaged by packing each cake with a pack.

As examples of a related-art tofu packing device, there are devices disclosed in Patent Literature 1 and Patent Literature 2, for example. Patent Literature 1 discloses a tofu automatic continuous packing device including: a first transfer conveyor that transfers a mold of tofu into a water tank; a cutting unit that sequentially cuts the molded tofu transferred into the water tank in longitudinal and lateral directions; a second transfer conveyor that sequentially transfers the cut tofu to outside of the water tank; and packing means that is installed downstream of the second transfer conveyor and packs the transferred tofu sequentially or simultaneously.

Patent Literature 2 discloses a tofu product conveying device provided with a clamp having a pair of clamping bodies arranged to face each other, the tofu product conveying device including: a holding head that clamps and holds a tofu product by bringing the pair of clamping bodies close to each other; and a head moving device that moves the holding head, the tofu product conveying device holding and conveying the tofu product. The clamp is provided with anti-slip means provided on contact surfaces of the pair of clamping bodies with each tofu product for preventing the held tofu product from slipping off.

CITATION LIST

Patent Literature

Patent Literature 1: JP-A-2007-006759
Patent Literature 2: JP-A-2014-226759

SUMMARY OF INVENTION

Technical Problem

In a tofu packing device, smooth work can be achieved by grasping a relative relationship including relative positioning of a cake of tofu and an empty pack in which the cake of tofu has not been packed. In Patent Literature 1, posture information or the like of an empty pack is not grasped by a camera or the like, and even when the pack is missing or a position or a posture of the pack is deviated, a robot performs an operation of covering the tofu as if the robot gripped an empty pack. Consequently, a smooth covering operation may not be performed. Since Patent Document 2 adopts a method of grasping soft tofu and dropping the soft tofu into an empty pack, it is naturally impossible to operate at high speed, and a processing capacity is limited.

The present invention provides a tofu packing device that enables smooth processing by preparing empty packs in which tofu have not been packed.

Solution to Problem

A tofu packing device according to an aspect of the present invention includes: a pack covering device configured to cover a plurality of cakes of tofu with packs in a state in which the packs are upside down, the plurality of cakes of tofu being aligned at predetermined intervals in front, rear, left and right directions on a conveying surface of a transfer conveyor; and a pack supply device configured to continuously supply the packs to the pack covering device from a lateral side of the transfer conveyor For example, the pack supply device extends up to a position above the transfer conveyor, and is configured to supply the packs to a position where the pack covering device is disposed.

For example, the pack supply device is configured to supply the packs along a direction intersecting with a traveling direction of the transfer conveyor.

For example, the pack supply device is configured to supply the packs along a direction perpendicular to the traveling direction of the transfer conveyor.

For example, the pack supply device includes: a first pack conveyor disposed on the lateral side of the transfer conveyor; and a second pack conveyor disposed above the transfer conveyor and configured to supply the packs supplied from the first pack conveyor to the pack covering device.

For example, the pack supply device further includes a stopper device configured to temporarily stop traveling of the packs on the first pack conveyor.

For example, the pack supply device further includes a pack supply magazine configured to hold a plurality of empty packs, and the pack supply device continuously supplies the packs taken out from the pack supply magazine.

For example, the pack supply device further includes a pack take-out robot capable of taking out the packs one by one from the pack supply magazine.

For example, when all the packs held in a specific pack supply magazine are taken out, the pack take-out robot takes out the packs from a spare pack supply magazine existing within an operation range of the pack take-out robot.

For example, the pack supply device includes: a pack supply magazine configured to hold a plurality of empty packs; and a pack take-out conveyor configured to convey the packs discharged from the pack supply magazine in a state in which openings of the packs face upward; and an inversion conveyor configured to invert the packs conveyed by the pack take-out conveyor with the openings facing upward such that the openings face downward.

For example, at least one of the pack supply device and the transfer conveyor is IP65 or higher.

Advantageous Effects of Invention

According to the present invention, since the pack supply device continuously supplies the empty packs before packing the tofu to the pack covering device, the tofu can be smoothly packed.

BRIEF DESCRIPTION OF DRAWINGS

FIG. 3 shows a tofu packing device according to a second embodiment, in which (a) is a side view of the tofu packing device at positions of a pack covering device and a pack supply conveyor, and (b) is a top view of the tofu packing device including the pack covering device, the pack supply conveyor, and a second transfer conveyor.

FIG. 4 shows the tofu packing device according to the second embodiment, in which (a) is a side view of the tofu packing device at the positions of the pack covering device and the pack supply conveyor, and (b) is a top view of the tofu packing device including the pack covering device, the pack supply conveyor, and the second transfer conveyor.

FIG. 16 is enlarged side views of a part of a pack supply conveyor in a tofu packing device according to a seventh embodiment, in which (a) shows a first step of taking out a pack, (b) shows a second step of taking out the pack, and (c) shows a third step of taking out the pack.

DESCRIPTION OF EMBODIMENTS

Hereinafter, embodiments of a tofu packing device to which the present invention is applied will be described in detail with reference to the drawings.

Figure 1:
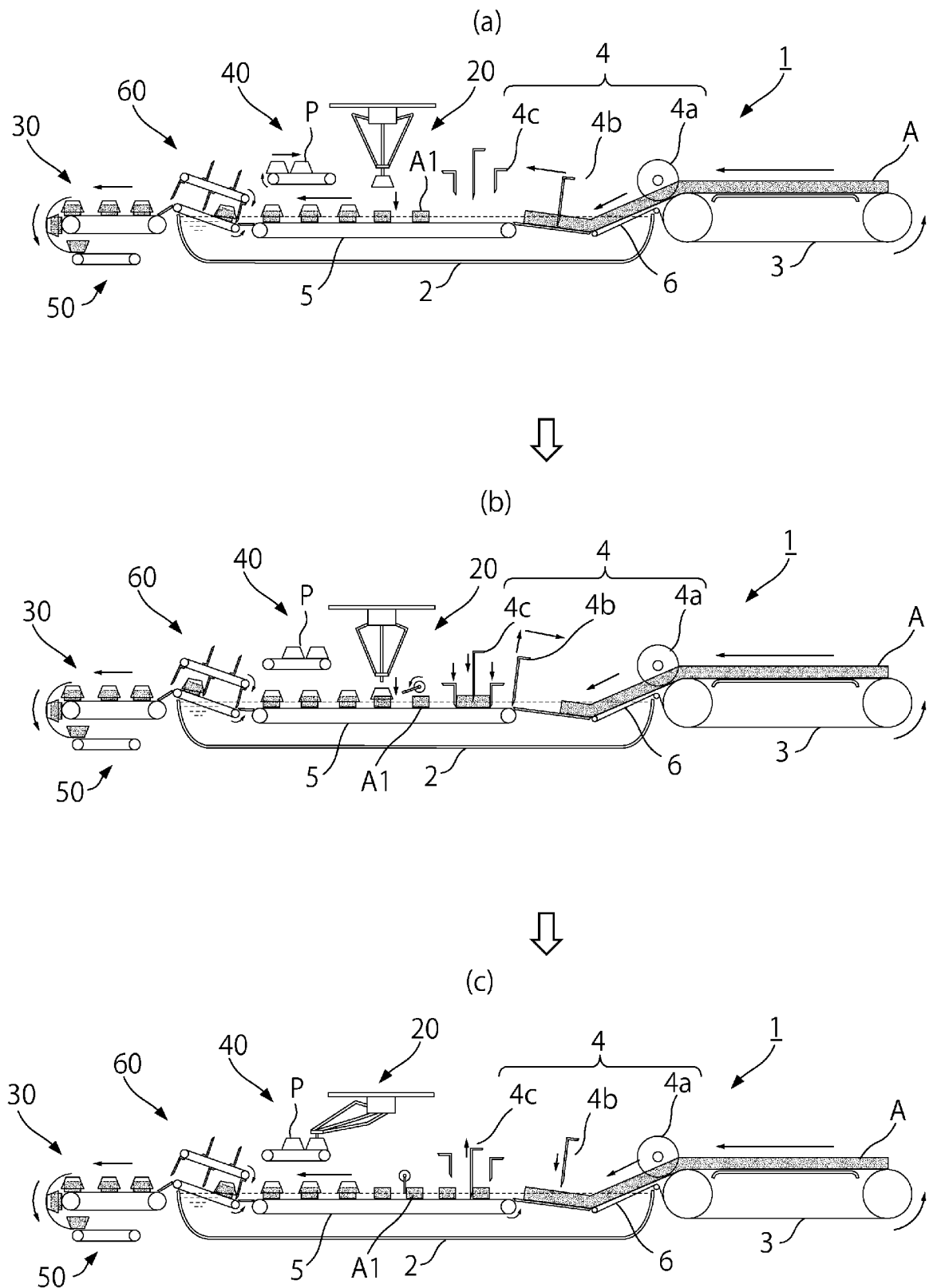
FIG. 1 shows an overall side view of a tofu packing device to which the present invention is applied and operations thereof, in which (a) shows an operation of cutting a continuous sheet-shaped tofu along a traveling direction and laterally cutting the tofu into a size of a plurality of cakes, (b) shows an operation of finally laterally cutting the tofu cut into a size of one cake, and (c) shows an operation of putting a pack on the tofu finally cut into the size of one cake.

(a) to (c) of FIG. 1 show a tofu packing device to which the present invention is applied. The tofu packing device 1 includes a circulating endless first transfer conveyor 3, a cutting device 4, a circulating endless second transfer conveyor 5, a pack covering device 20, a pack supply conveyor (pack supply device) 40, a rising conveyor 60, an inversion device 30, and a circulating endless third transfer conveyor 50.

The first transfer conveyor 3 transfers a leading end of continuous sheet-shaped tofu A into a water tank 2. The cutting device 4 appropriately and sequentially cuts the continuous sheet-shaped tofu A in longitudinal and lateral directions in a state where a part of the tofu A is exposed from water (semi-submerged state), and cuts the tofu A into cakes of tofu A1. The second transfer conveyor 5 sequentially arranges and transfers the cakes of tofu A1, which has been obtained by cutting, in a semi-submerged state at intervals. The pack covering device 20 is installed above the second transfer conveyor 5, and sequentially covers and packs the packs P on the cakes of tofu A1 transferred by the pack supply conveyor 40. The rising conveyor 60 takes out each cake of tofu A1 covered with the pack P from the water tank 2. The inversion device 30 is disposed on a downstream side of the rising conveyor 60 and vertically inverts the packs P (in a state of covering the cakes of tofu A1). The third transfer conveyor 50 transfers the vertically inverted packs P to the next processing step (packaging step). In the present application, the traveling direction of the continuous sheet-shaped tofu is defined as a longitudinal direction or a column direction, and a direction perpendicular to the traveling direction is defined as a lateral direction or a row direction.

The first transfer conveyor 3 is for transferring the leading end of the continuous sheet-shaped tofu A into the water tank 2, and guides the sheet-shaped tofu A from a vicinity of a peripheral edge on a rear side of the water tank 2 into the water tank 2 via a delivery plate 6. The sheet-shaped tofu A is further guided to the second transfer conveyor 5, and is appropriately cut into cakes by the cutting device 4 from a downstream portion of the delivery plate 6 to an upstream portion of the second transfer conveyor 5. The cutting device 4 includes a roll cutter 4a that cuts the continuous sheet-shaped tofu A along the traveling direction (longitudinal direction), a lateral cutter 4b that laterally cuts the tofu A into a size of a plurality of cakes (two cakes in this example; see (b) and (c) of FIG. 1), and a lateral cutting member 4c that finally laterally cuts the tofu A cut into the size of the plurality of cakes by the lateral cutter 4b into a size of one cake (see (b) and (c) of FIG. 1). However, a specific structure or the like of the cutting device 4 is not particularly limited, and the cutting device 4 may cut into a size of one cake unit (minimum unit) with a lattice-shaped cutting blade at a time.

Figure 2:
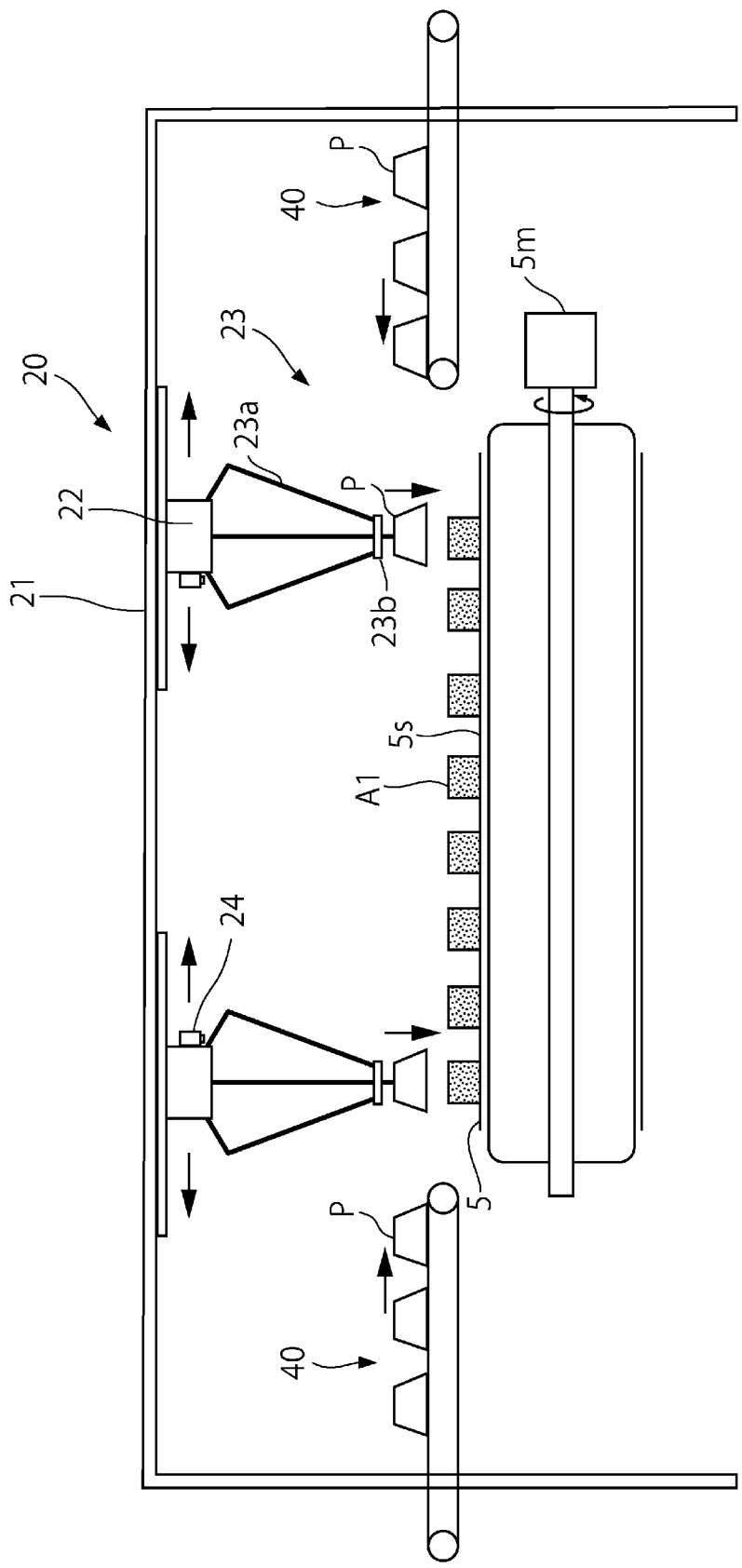
FIG. 2 shows the tofu packing device according to a first embodiment, and is a side view of the tofu packing device at positions of a pack covering device and a pack supply conveyor.

The second transfer conveyor 5 is installed inside the water tank 2, and transfers the cakes of tofu A1, which has been obtained by cutting, in the semi-submerged state, that is, in a state where only upper portions of the cakes of tofu A1 are exposed from the water, while sequentially arranging the cakes of tofu A1 at intervals. The pack covering device 20 covers the pack P on a portion of each cake of tofu A1 conveyed by the second transfer conveyor 5 exposed from the water. The pack P is continuously supplied to the pack covering device 20 by the pack supply conveyor 40. The pack covering device 20 and the pack supply conveyor 40 will be described in detail later. In (a) to (c) of FIG. 1, the pack supply conveyor 40 is shown as being disposed parallel to the traveling direction of the second transfer conveyor 5 (traveling direction of the tofu), but in an actual embodiment, as shown in FIG. 2 and subsequent drawings, the pack supply conveyor 40 is disposed so as to intersect with the traveling direction of the second transfer conveyor 5, more specifically, so as to be perpendicular to the traveling direction of the second transfer conveyor 5.

The rising conveyor 60 takes out each cake of tofu A1 covered with the pack P from the water tank 2, and transfers the cake of tofu A1 to the inversion device 30. The inversion device 30 is disposed on the downstream side of the rising conveyor 60 and vertically inverts the packs P (in the state of covering the cakes of tofu A1). The third transfer conveyor 50 transfers the vertically inverted packs P to the next processing step (packaging step). The tofu in which a defect such as a chip is found by photographing with a camera is not covered with the pack P, and is directly transferred to the inversion device 30 by the second transfer conveyor 5 or the like. Therefore, by providing a gap in a guide of the inversion device 30, it is possible to remove a defective tofu by making the tofu collapse and fall down. The gap of the guide is obtained by, for example, forming the guide in a fence shape, but a fence in the fence shape may have fineness or sharpness that easily bites into the tofu, such as a circle, a square, a triangle, or the like in cross section. A shape of the guide is limited to the fence shape, and may be, for example, a lattice shape or the like, and there may be a mechanism in which the tofu collapses finely and falls into a receiving tray or a screw-type disposal conveyor below.

In the tofu packing device 1, it is general that various devices do not stop during production and operate continuously in synchronization with each other at a constant speed, but may operate intermittently in synchronization with each other.

Next, the pack covering device 20 will be described. As shown in FIG. 2, in the pack covering device 20, a support rail 21 serving as a base is hung in a conveyor width direction above the second transfer conveyor 5 driven by a motor 5m. A moving base portion 22 is slidably provided on the support rail 21, and a parallel link mechanism 23 is provided on the moving base portion 22. That is, the pack covering device 20 is a robot including the parallel link mechanism 23 having three link shafts 23a that three-dimensionally drive a distal end gripping portion 23b that grips the pack P. The distal end gripping portion 23b can be of an adsorption type in which the pack P is sucked and adsorbed by a suction cup, a chuck type in which forceps having two to four fingers are provided to sandwich the pack P, or a gripping structure in which these are combined, and is not particularly limited as long as the distal end gripping portion 23b can firmly grip the pack P in the same orientation of the pack. A horizontal rotation axis or a vertical rotation axis may also be provided in the moving base portion 22 or the distal end gripping portion 23b, and four to six control axes may be provided in total. The parallel link mechanism is preferable, but a SCARA robot as described later may also be used, and a high-speed type robot capable of operating 100 times of reciprocation (cycles) or more per minute (100 CPM; abbreviation for cycle per minute) over a horizontal distance of 200 mm to 300 mm may be used. It is more preferable that the robot is a high-speed robot capable of operating 100 times of reciprocation or more per minute (100 CPM; abbreviation for cycle per minute) over a horizontal distance of 0.5 m to 1.5 m.

Since the support rail 21 serving as the base is located at a position higher than the second transfer conveyor 5, space saving is achieved, and, for example, a space surrounded by the support rail 21 is covered with a cover or the like, cleaning of the second transfer conveyor 5 and other devices inside is facilitated. For example, by cleaning the space with a cleaning nozzle or the like capable of performing CIP cleaning sterilization or SIP sterilization (steam sterilization), cleaning sterilization or sterilization of a conveyor or various components with which the tofu is in direct contact can be performed, and dust, dirt, foreign matters, and the like can also be washed off. It is preferable that the various robots and conveyors pass a standard of IP65 or higher (JIS C0920-1993), which has high anticorrosion properties against food detergents and disinfectants and high dustproof and waterproof properties. It is preferable to blow steam during production and keep inside of a container at 60° C. to 100° C. by controlling a temperature. A member such as a receiving tray for preventing foreign matters from entering may be provided below the parallel link mechanism 23, or the parallel link mechanism 23 itself may have a specification for food industry in which foreign matters do not occur.

An image sensor (camera device) 24 that captures an image of each cake of tofu A1 flowing on a conveying surface 5s is provided on the moving base portion 22 of the pack covering device 20. Each cake of tofu A1 can be accurately covered with the pack P according to a position of each cake of tofu A1 captured by the image sensor 24. An illumination member for the image sensor may be appropriately provided as necessary.

The image of the tofu A1 is analyzed based on a detection signal from the image sensor 24. Therefore, when abnormality of the tofu A1 is detected based on the image analysis, a treatment is performed so that the tofu A1 is not covered with the pack P. The abnormality of the tofu A1 mentioned here means, for example, detection of a cake of tofu A1 having a small size (cutting dimension), a cake of tofu A1 cut and deformed into a trapezoidal shape or a rhombus shape, a cake of tofu A1 broken or chipped, a cake of tofu A1 having a large number of air bubbles in a cut surface, or a cake of tofu A1 having foreign matters attached thereto. By performing image analysis on the image signal immediately before each cake of tofu A1 on the second transfer conveyor 5, even if each cake of tofu A1 is slightly displaced, a covering position of the puck P by the distal end gripping portion 23b is corrected with respect to the tofu A1, and the puck is accurately covered.

Two parallel link mechanisms 23 are installed on left and right sides in the conveyor width direction. Therefore, a working area of two pack covering devices 20 is divided into two in the conveyor left-right width direction. Here, a horizontal movement range of the pack covering device 20 is set in a range of 0.5 meters to 1.5 meters since an arrangement width of the cakes of tofu A1 is in a range of 1.0 meter to 3.0 meters, for example, and an operation accuracy is within ±2.0 millimeters, preferably within ±0.2 millimeters, and more preferably within ±0.02 millimeters. However, the number of parallel link mechanisms 23 is not particularly limited.

In addition, (the robot of) the parallel link mechanism 23 and (the robot of) a SCARA mechanism (not shown) according to the present embodiment are desirably robots having a high-speed processing capability (capability capable of high-speed driving) of 100 times of reciprocations (100 CPM) or more in a horizontal reciprocation over a horizontal distance of, for example, 0.2 m to 3 m, preferably 0.5 m to 1.5 m. The term "high-speed processing" mentioned in the present specification refers to a processing capacity of 4000 to 6000 cakes or more per hour in one pack covering device 20. If two devices are provided, the processing capacity is doubled. It should be noted that a multi joint (serial link mechanism) robot may be used as long as the robot can perform processing at a high speed equal to or higher.

Next, the pack supply conveyor (pack supply device) 40 will be described. The tofu packing device 1 including the pack supply conveyor 40 shown in FIG. 2 is a first embodiment, and embodiments of the tofu packing device including the pack supply conveyor 40 of various embodiments will be described below.

In the present embodiment, the packs P are supplied by the pack supply conveyors 40 provided adjacent to both sides of the second transfer conveyor 5 in the width direction. The pack supply conveyor 40 continuously supplies the packs to the pack covering device 20 from a lateral side of the second transfer conveyor 5. This makes it possible to smoothly pack the tofu.

For example, it is possible to provide the same number of pack supply conveyors 40 as the number of pack covering devices 20. As will be described later, since at least one pack supply magazine that stocks a large number of empty packs can be provided in one pack supply conveyor 40, an operator who supplies the empty packs can intensively work on the one magazine, and a burden is reduced. Once the magazine is replenished to a certain extent, the pack P can be replenished to a pack supply unit on an opposite side, or other work can be done for a while. The pack supply conveyor may be provided with an image sensor capable of detecting a state of the pack P.

FIGS. 3 and 4 show the tofu packing device 1 according to a second embodiment. The packs P are supplied by the pack supply conveyor 40 provided adjacent to the second transfer conveyor 5 in a width direction. The pack supply conveyor 40 continuously supplies the packs to the pack covering device 20 from a lateral side of the second transfer conveyor 5. For example, it is possible to provide the same number of pack supply conveyors 40 as the number of pack covering devices 20. As will be described later, since at least one pack supply magazine that stocks a large number of empty packs can be provided in one pack supply conveyor 40, an operator who supplies the empty packs can intensively work on the one magazine, and a burden is reduced. Once the magazine is replenished to a certain extent, the pack P can be replenished to a pack supply unit on an opposite side, or other work can be done for a while. The pack supply conveyor may be provided with an image sensor capable of detecting a state of the pack P.

The pack supply conveyor 40 according to the present embodiment extends to above the second transfer conveyor 5, and continuously supplies the pack P to a position where the pack covering device 20 (three parallel link mechanisms 23) is disposed. Thereby, the pack covering device 20 (the three parallel link mechanisms 23) can grip the pack P without largely moving, and working time can be shortened.

The pack supply conveyor 40 supplies the packs P along a direction intersecting with a traveling direction of the second transfer conveyor 5, and particularly in the embodiment, the pack supply conveyor 40 supplies the packs P along a direction perpendicular to the traveling direction of the second transfer conveyor 5. Thereby, the pack supply conveyor 40 can efficiently supply the packs P to the pack covering device 20.

The pack supply conveyor 40 includes a circulating endless first pack conveyor 41 disposed on a side of the second transfer conveyor 5, and a circulating endless second pack conveyor 42 disposed above the second transfer conveyor 5 and configured to supply the packs P supplied from the first pack conveyor 41 to the pack covering device 20. A stopper device 43 that temporarily stops traveling of the packs P is provided at an end portion of the first pack conveyor 41 on a side adjacent to the second pack conveyor 42. The stopper device 43 includes a motor 44 and a stopper 45, and the motor 44 drives the stopper 45 in a vertical direction at a predetermined timing to stop the traveling of the packs P and advance the packs P at an appropriate timing. In this way, by providing two pack conveyors 41, 42 and the stopper device 43, the packs P can be supplied to the pack covering device 20 at an appropriate pace.

FIG. 3 shows a state of a timing at which the parallel link mechanism 23 grips and lifts the pack P from the second pack conveyor 42, and FIG. 4 shows a state of a timing at which each cake of tofu A1 is covered with the pack P gripped by the parallel link mechanism 23.

Figure 5:
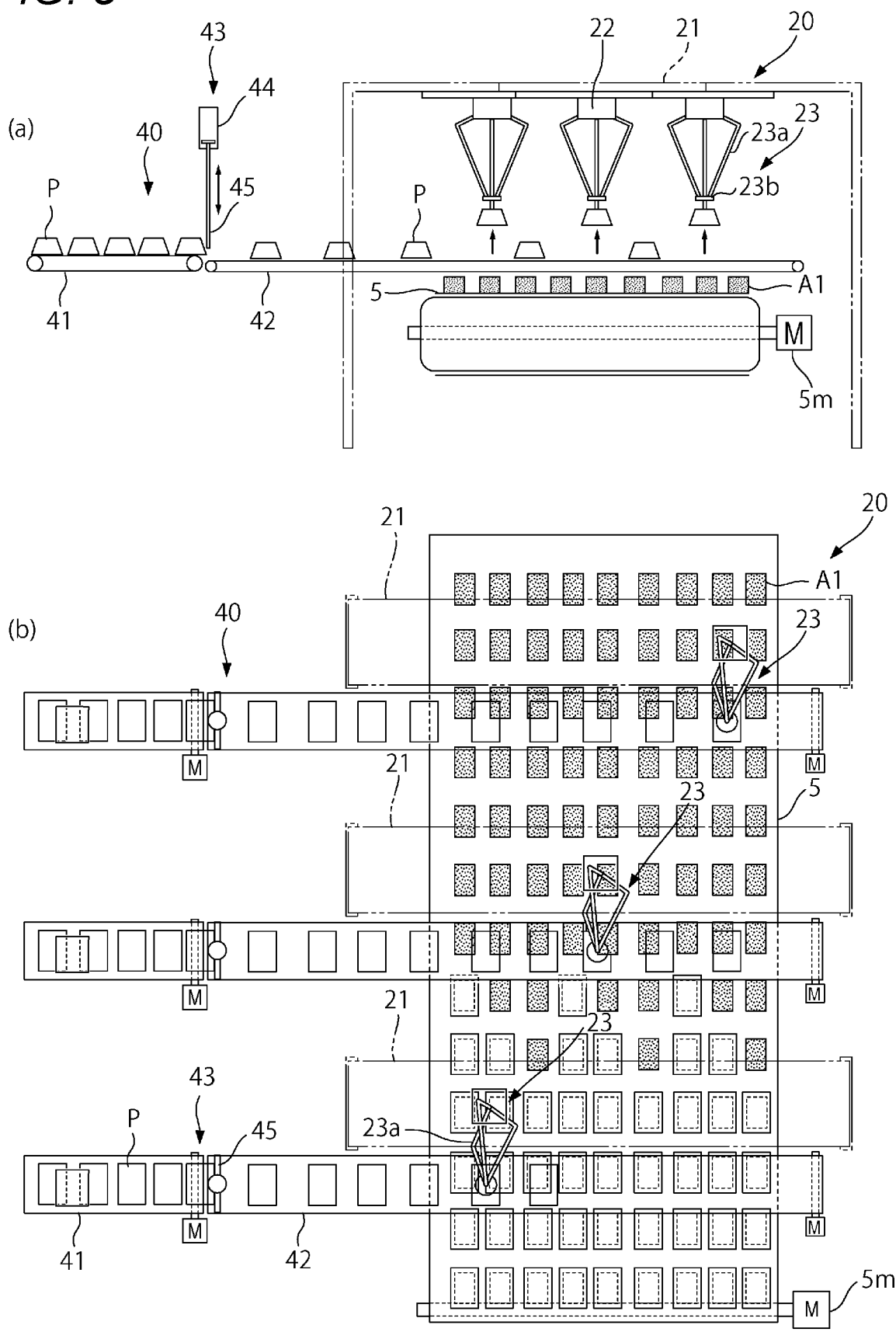
FIG. 5 shows a tofu packing device according to a third embodiment, in which (a) is a side view of the tofu packing device at positions of a pack covering device and a pack supply conveyor, and (b) is a top view of the tofu packing device including the pack covering device, the pack supply conveyor, and a second transfer conveyor.
Figure 6:
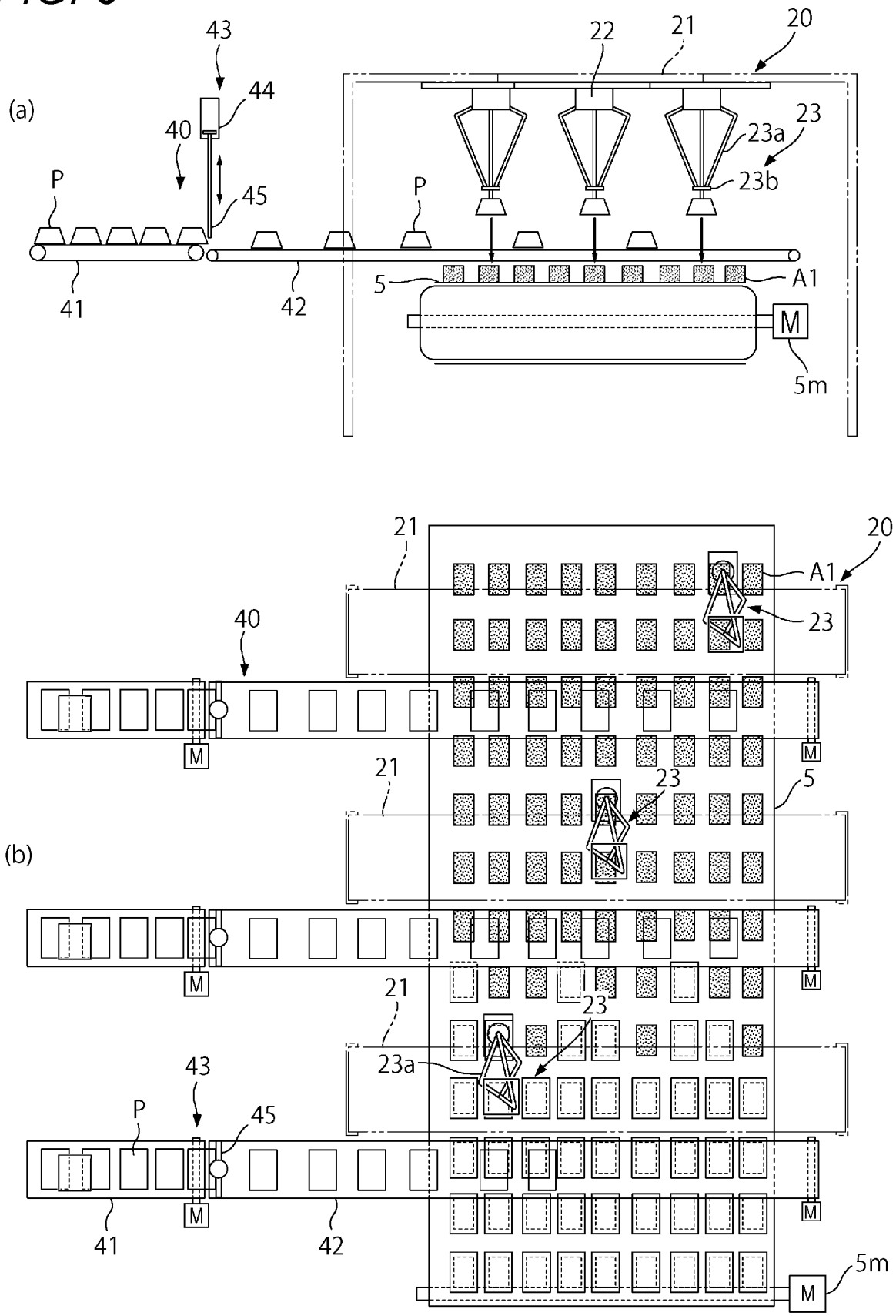
FIG. 6 shows the tofu packing device according to the third embodiment, in which (a) is a side view of the tofu packing device at the positions of the pack covering device and the pack supply conveyor, and (b) is a top view of the tofu packing device including the pack covering device, the pack supply conveyor, and the second transfer conveyor.

FIGS. 5 and 6 show the tofu packing device 1 according to a third embodiment. In the second embodiment, three parallel link mechanisms 23 are provided on one support rail 21, and the three parallel link mechanisms 23 are disposed at the same position in the traveling direction of the second transfer conveyor 5. On the other hand, in the third embodiment, three support rails 21 are disposed at shifted positions along a traveling direction of the second transfer conveyor 5, and accordingly, three parallel link mechanisms 23 are respectively disposed on the support rails 21, so that the three parallel link mechanisms 23 are disposed at shifted positions along the traveling direction of the second transfer conveyor 5. FIG. 5 shows a state of a timing at which the parallel link mechanism 23 grips and lifts the pack P from the second pack conveyor 42, and FIG. 6 shows a state of a timing at which each cake of tofu A1 is covered with the pack P gripped by the parallel link mechanism 23.

Figure 7:
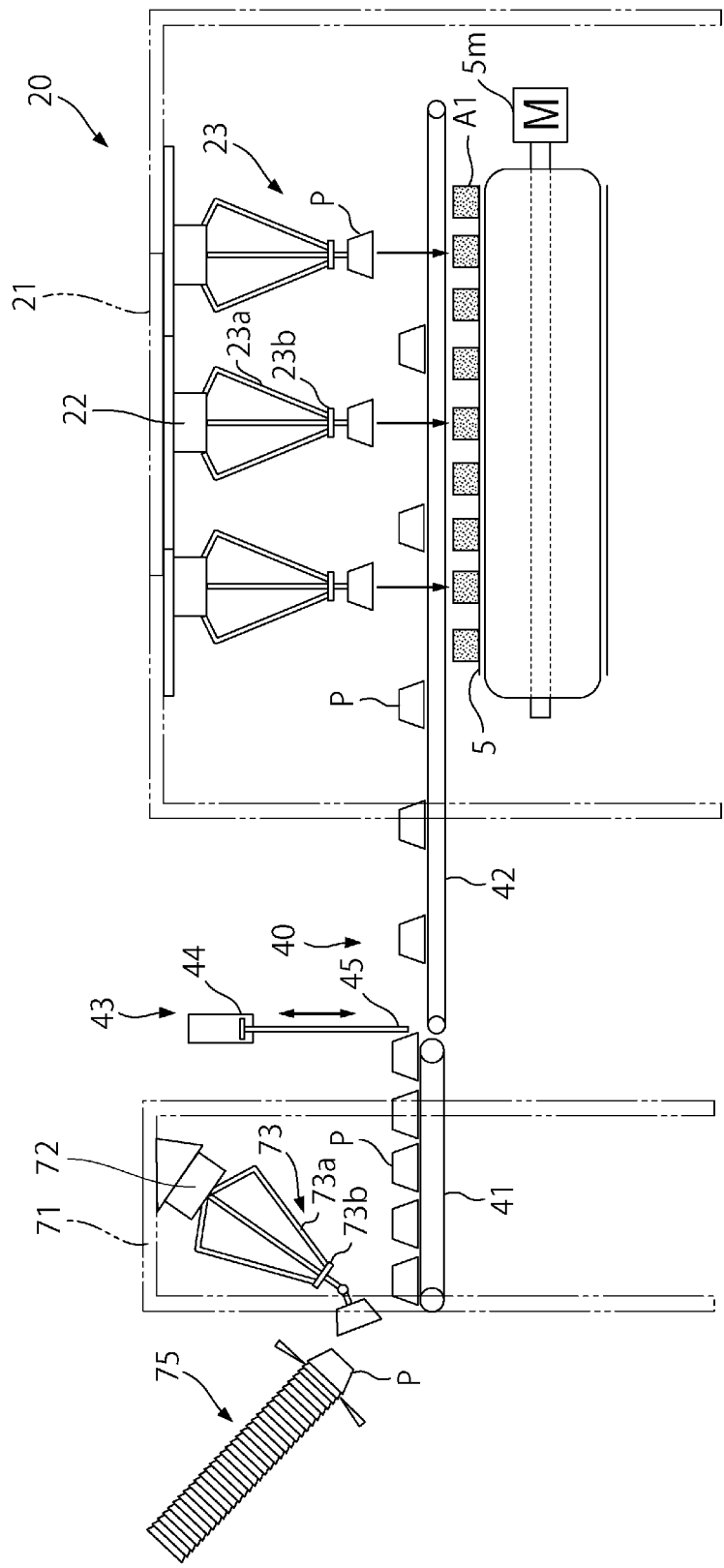
FIG. 7 is a side view of a tofu packing device according to a fourth embodiment at positions of a pack covering device and a pack supply conveyor.
Figure 8:
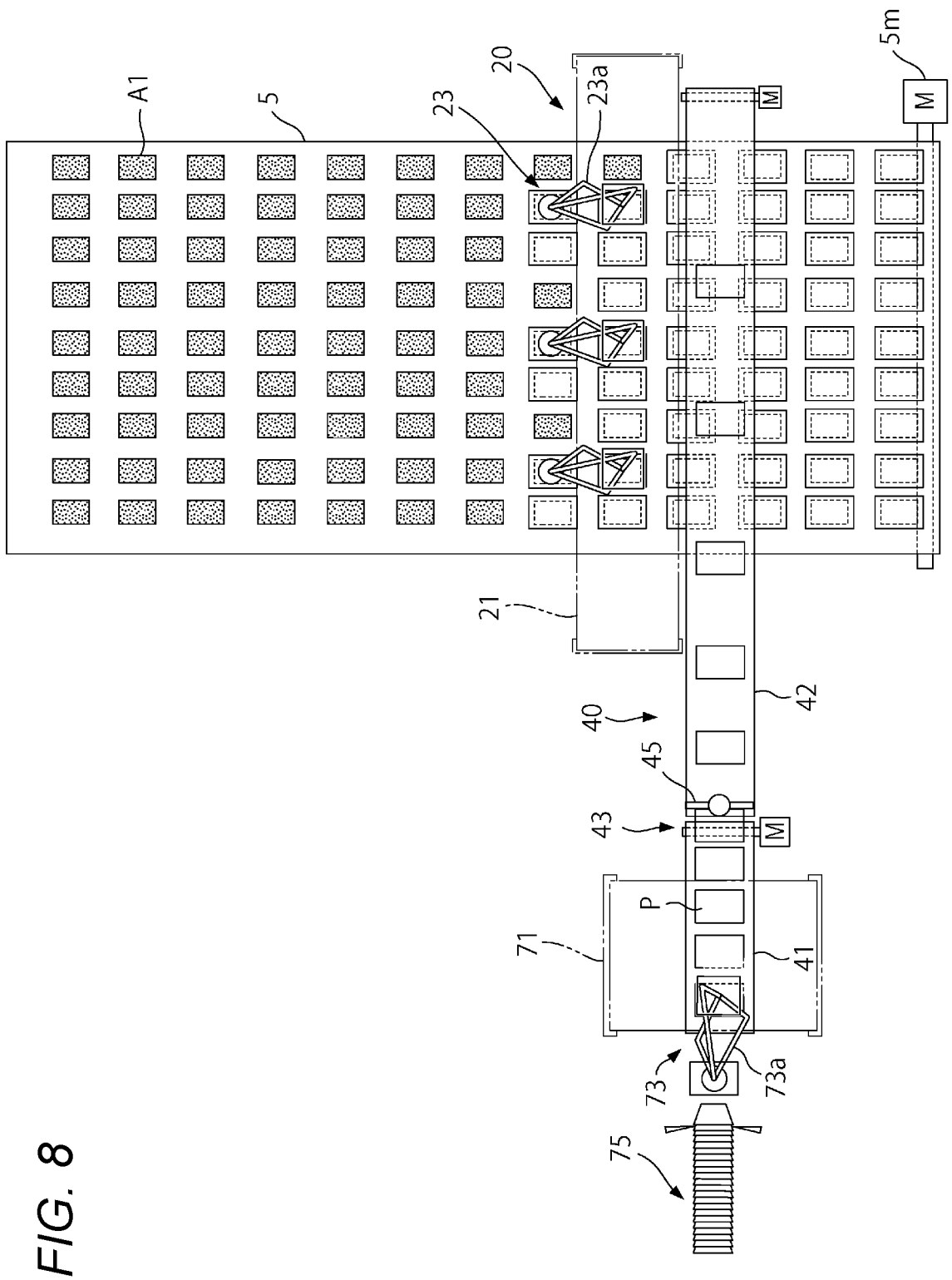
FIG. 8 is a top view of the tofu packing device according to the fourth embodiment including the pack covering device, the pack supply conveyor, and a second transfer conveyor.

FIGS. 7 and 8 show the packing device 1 according to a fourth embodiment. In the present embodiment, in addition to a configuration equivalent to that of the packing device 1 according to the second embodiment, the pack supply conveyor 40 further includes a support rail 71, a moving base portion 72, a parallel link mechanism 73, and a pack supply magazine 75. The support rail 71, the moving base portion 72, and the parallel link mechanism 73 have configurations similar to those of the support rail 21, the moving base portion 22, and the parallel link mechanism 23. That is, above the first pack conveyor 41, the support rail 71 serving as a base is bridged in a conveyor traveling direction. The moving base portion 72 is slidably provided on the support rail 21, and the parallel link mechanism 73 is provided on the moving base portion 72. That is, the pack supply conveyor 40 includes the parallel link mechanism 73 having three link shafts 73a that three-dimensionally drive a distal end gripping portion 73b that grips the pack P. The distal end gripping portion 73b can be of an adsorption type in which the pack P is sucked and adsorbed by a suction cup, a chuck type in which forceps having two to four fingers are provided to sandwich the pack P, or a gripping structure in which these are combined, and is not particularly limited as long as the distal end gripping portion 73b can firmly grip the pack P in the same orientation of the pack. A horizontal rotation axis or a vertical rotation axis may also be provided in the moving base portion 72 or the distal end gripping portion 73b, and four to six control axes may be provided in total. The parallel link mechanism is preferable, but a SCARA robot may also be used, and a high-speed type robot capable of operating 100 times of reciprocation (cycles) per minute (100 CPM; abbreviation for cycle per minute) over a horizontal distance of 200 mm to 300 mm may be used. It is more preferable that the robot is a high-speed robot capable of operating 100 times of reciprocation or more per minute (100 CPM; abbreviation for cycle per minute) over a horizontal distance of 0.5 m to 1.5 m.

The pack supply magazine 75 holds a plurality of empty packs P stacked in a straight line obliquely upward. The parallel link mechanism 73 functions as a pack take-out robot capable of continuously supplying the packs P taken out one by one from the pack supply magazine 75. Thereby, a supply efficiency of the packs P can be improved.

The parallel link mechanism 73 that is a pack take-out robot adjusts a position and an angle of the distal end gripping portion 73b according to image information of a camera that captures a posture such as a position and an orientation of the empty pack at an taken-out position of the pack supply magazine 75. After gripping the pack P, the parallel link mechanism 73 moves the pack P to a fixed position above the first pack conveyor 41, and similarly adjusts the position and the angle of the distal end gripping portion 73b according to information from the camera to place the pack P on the first pack conveyor 41. Therefore, the parallel link mechanism 73 can accurately take out the empty packs one by one from the pack supply magazine 75 and accurately and reliably place the empty packs at fixed positions of the first pack conveyor 41. A state in which the pack is placed at the fixed position is monitored by the camera, error processing is performed including removal of the pack in an abnormal state at the fixed position, and the empty pack is compensated for the vacant fixed position, so that a loss can be further improved. However, even if a position and a posture of the empty pack on the first pack conveyor 41 taken out by the parallel link mechanism 73 are somewhat random, the stopper device on a downstream side serves as a temporary buffer of the pack, and the pack can be smoothly supplied. A plurality of parallel link mechanisms 73 may be provided for one pack supply conveyor 40.

In the shown pack supply magazine 75, the packs P are stacked in a state in which openings thereof face upward, and the parallel link mechanism 73 grips and takes out the pack P in a lowermost stage. However, the packs P may be stacked in a state in which the openings thereof face downward (in a state in which the packs P face down), and the parallel link mechanism 73 may grip and take out the pack P at an uppermost stage.

Figure 9:
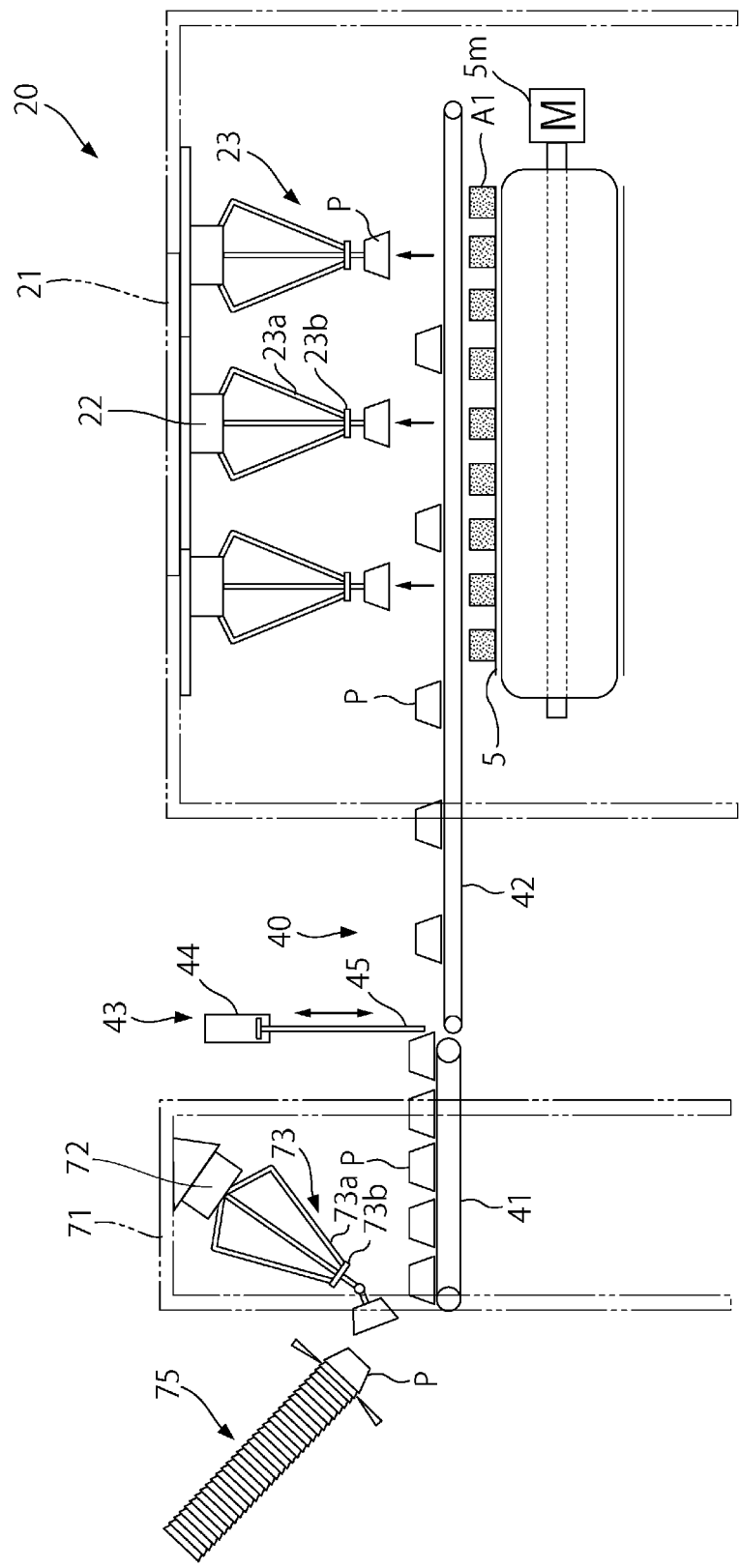
FIG. 9 is a side view of a tofu packing device according to a fifth embodiment at positions of a pack covering device and a pack supply conveyor.
Figure 10:
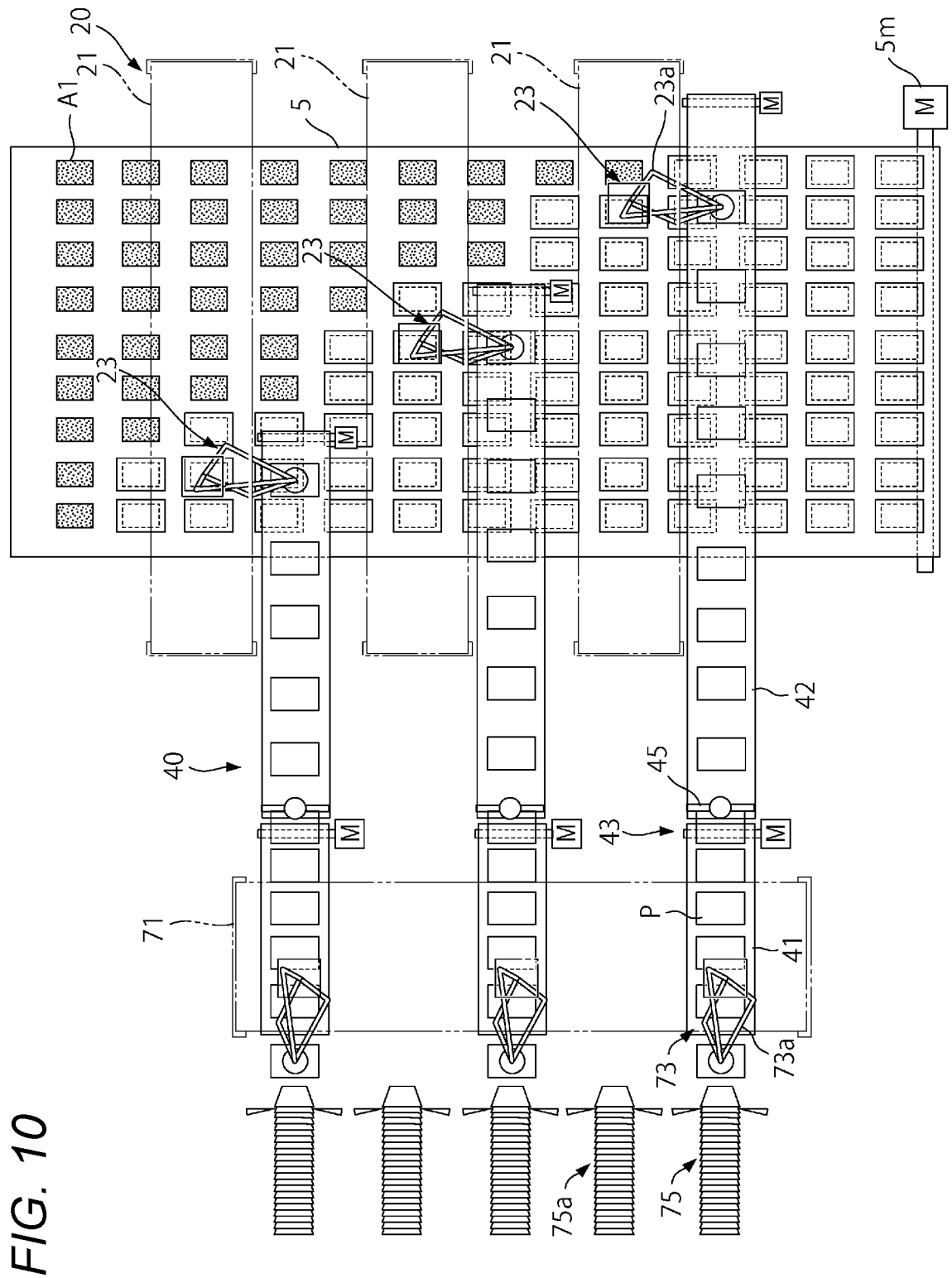
FIG. 10 is a top view of the tofu packing device according to the fifth embodiment including the pack covering device, the pack supply conveyor, and a second transfer conveyor.

FIGS. 9 and 10 show the packing device 1 according to a fifth embodiment. In the present embodiment, in addition to a configuration equivalent to that of the packing device 1 according to the third embodiment, the pack supply conveyor 40 further includes the support rail 71, the moving base portion 72, the parallel link mechanism 73, the pack supply magazine 75, and a spare pack supply magazine 75a. In the present embodiment, the moving base portion 72 is slidably provided on one support rail 71, and the parallel link mechanism 73 is provided on the moving base portion 72. The moving base portion 72, the parallel link mechanism 73, and the pack supply magazine 75 have configurations the same as those of the fourth embodiment.

Further, in the present embodiment, the spare pack supply magazine 75a is provided between a plurality of the pack supply magazines 75, and the parallel link mechanism 73 as a pack take-out robot can take out the packs P from the spare pack supply magazine 75a existing within an operation range of the parallel link mechanism 73 when all the packs P held in the specific pack supply magazine 75 are taken out. Thereby, the packs P can be continuously supplied without interruption.

Figure 11:
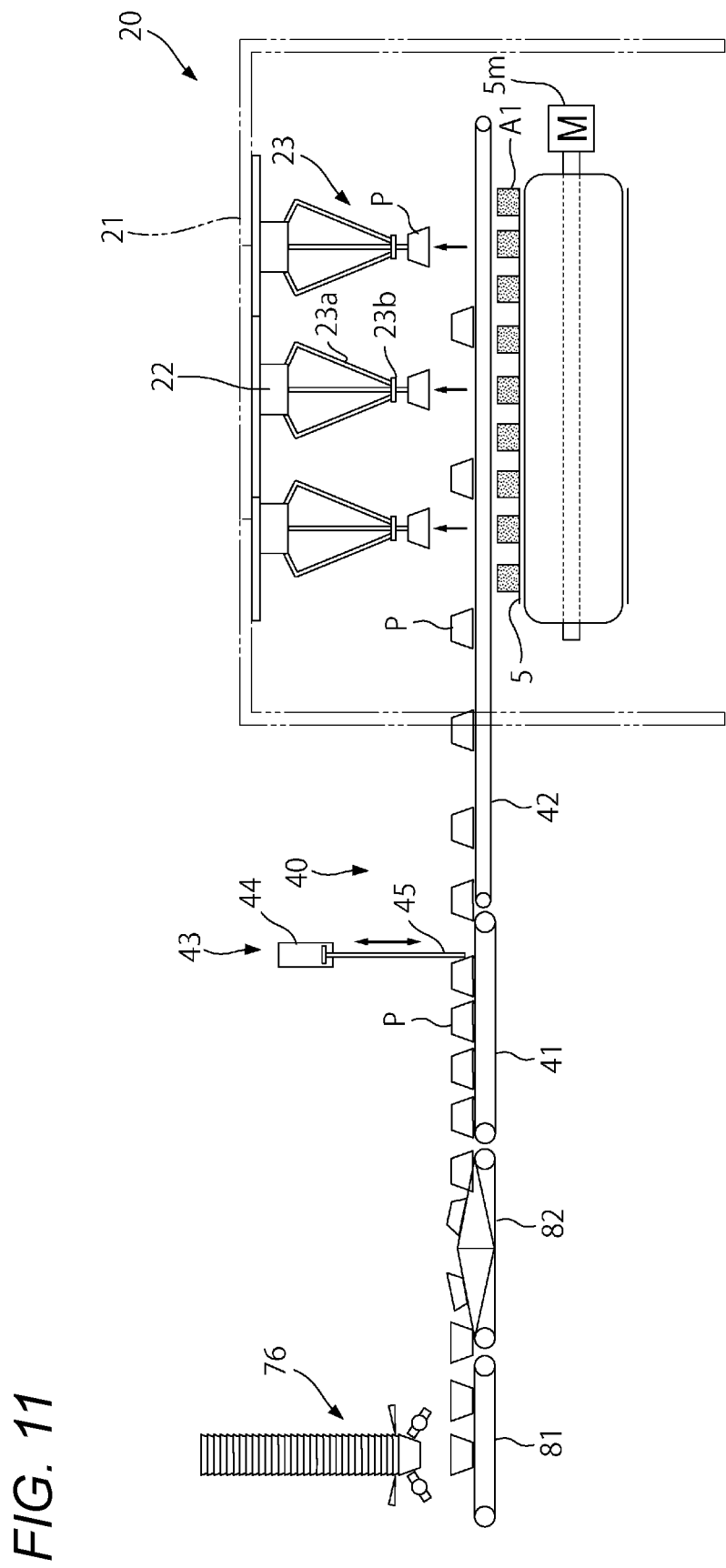
FIG. 11 is a side view of a tofu packing device according to a sixth embodiment at positions of a pack covering device and a pack supply conveyor.
Figure 12:
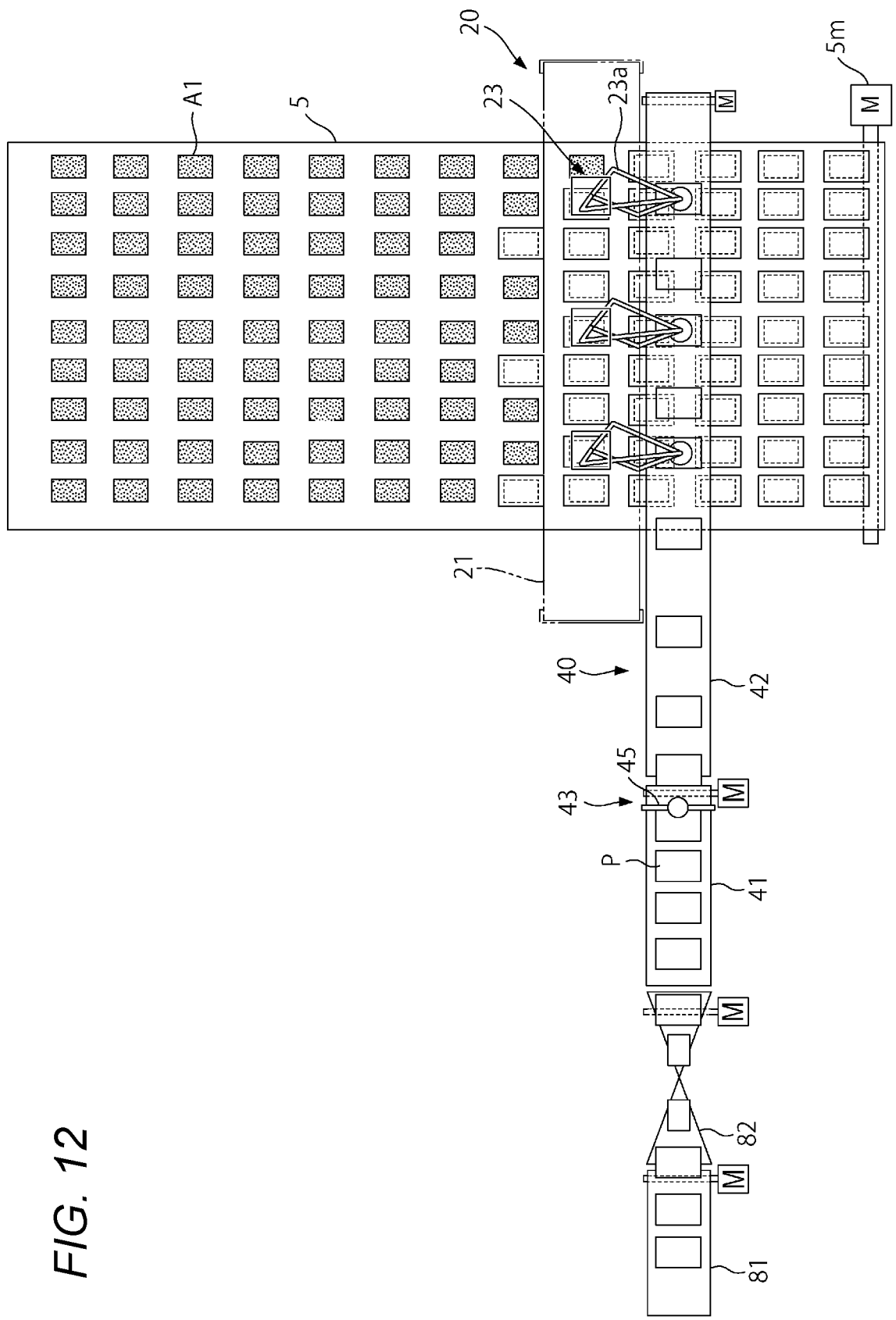
FIG. 12 is a top view of the tofu packing device according to the sixth embodiment including the pack covering device, the pack supply conveyor, and a second transfer conveyor.
Figure 13:
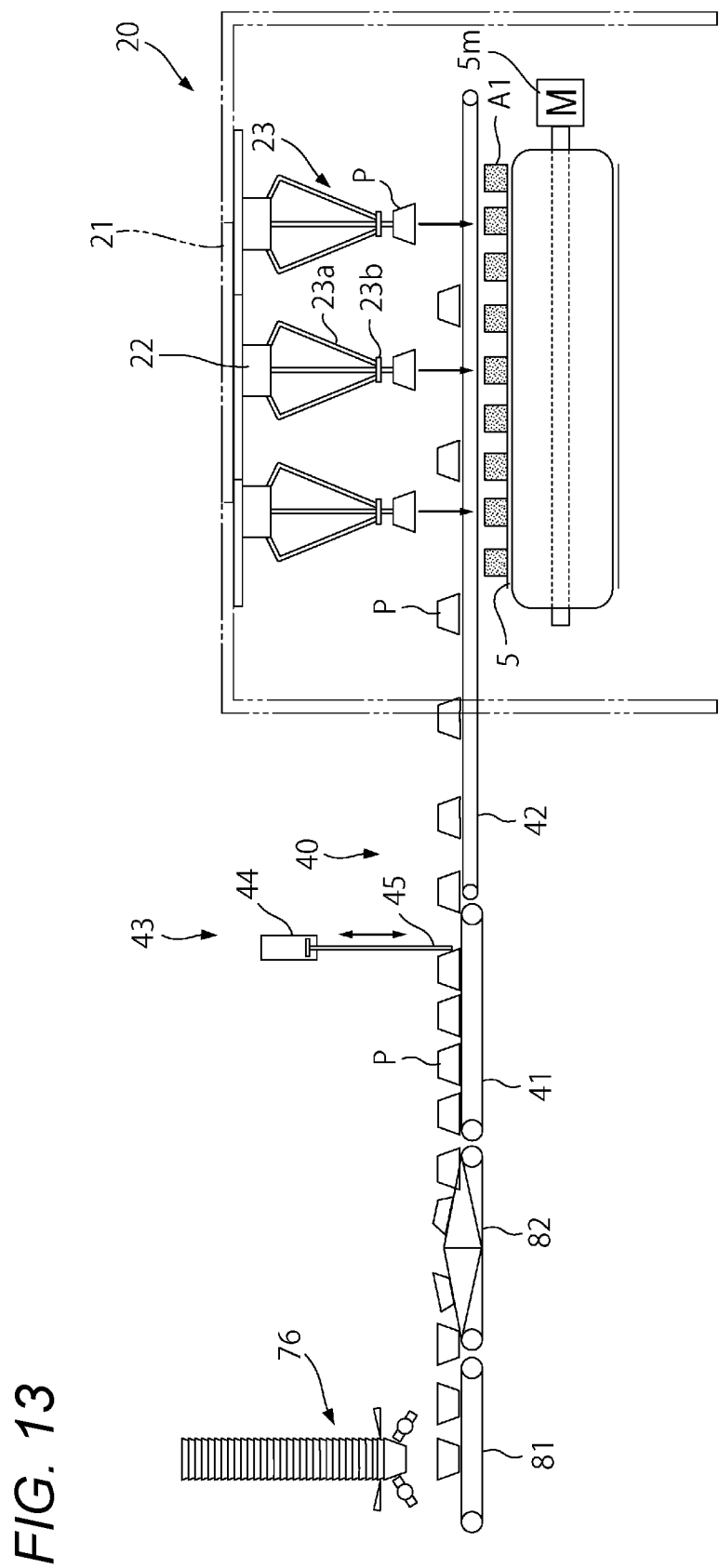
FIG. 13 is a side view of the tofu packing device according to the sixth embodiment at the positions of the pack covering device and the pack supply conveyor.
Figure 14:
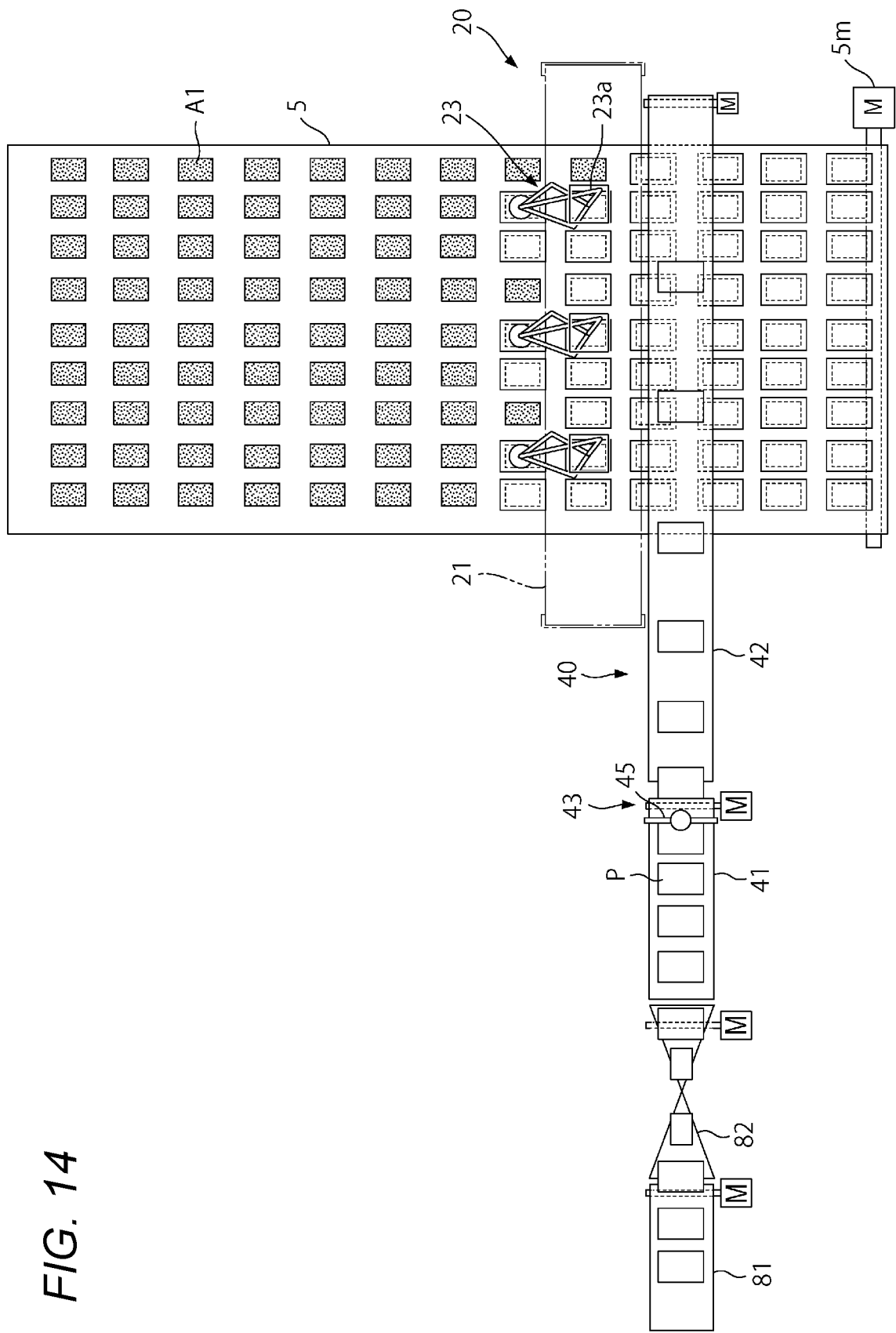
FIG. 14 is a top view of the tofu packing device according to the sixth embodiment including the pack covering device, the pack supply conveyor, and the second transfer conveyor.

FIGS. 11 to 15 show the packing device 1 according to a sixth embodiment. In the present embodiment, in addition to a configuration equivalent to that of the packing device 1 according to the second embodiment, a circulating endless pack take-out conveyor 81, an inversion conveyor 82, and a pack supply magazine 76 are provided. In FIGS. 12 and 14, the pack supply magazine 76 is not shown.

In the fourth and fifth embodiments, the parallel link mechanism 73 takes out the packs P and arranges the packs P on the first pack conveyor 41 in a state in which the packs P are inverted and the openings face downward (in a state in which the packs P face down). On the other hand, in the present embodiment, the pack supply magazine 76 discharges the packs P with openings thereof facing upward, and are disposed on the pack take-out conveyor 81 with the openings facing upward.

The pack supply magazine 76 holds a plurality of empty packs P stacked vertically and linearly upward. For example, the pack supply magazine 76 is of a type in which the packs P are taken out one by one from a lower side with a rotating rubber, and is a mechanism in which a claw is caught on a flange of the pack P, and when one pack is taken out downward, the claw is caught on the pack flange directly above, becomes a stopper, and is then separated. The pack take-out conveyor 81 conveys the taken out pack P to the inversion conveyor 82, and the inversion conveyor 82 inverts the pack P whose opening faces upward so that the opening faces downward (in a state in which the pack P faces down), and supplies the pack P to the first pack conveyor 41. Thereby, the pack P can be efficiently supplied.

Figure 15:
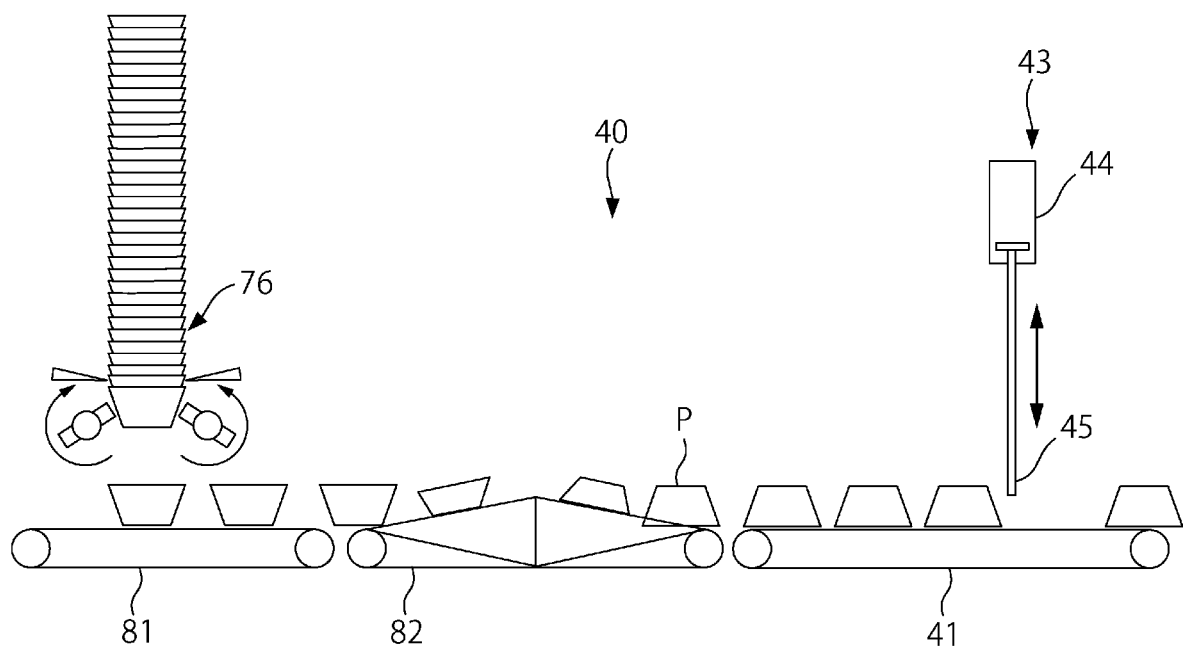
FIG. 15 is an enlarged side view of a part of the pack supply conveyor in the tofu packing device according to the sixth embodiment.

FIGS. 11 and 12 show a state of a timing at which the parallel link mechanism 23 grips and lifts the pack P from the second pack conveyor 42, and FIGS. 13 and 14 show a state of a timing at which each cake of tofu A1 is covered with the pack P gripped by the parallel link mechanism 23. FIG. 15 is an enlarged side view of a part of the pack supply conveyor 40 in the tofu packing device 1 according to the sixth embodiment.

FIG. 16 is enlarged side views of a part of the pack supply conveyor 40 in the tofu packing device 1 according to a seventh embodiment, in which (a) shows a first step of taking out a pack, (b) shows a second step of taking out the pack, and (c) shows a third step of taking out the pack. The pack supply conveyor 40 according to the present embodiment includes a pack take-out tool 85 and a pack push-out tool 86 in addition to the components shown in FIG. 15. In the first step in (a) of FIG. 16, the pack P has not yet been lowered to a position of the pack take-out conveyor 81 as indicated by a dotted line. In the second step in (b) of FIG. 16, the pack take-out tool 85 takes out the pack P from the pack supply magazine 76 and lowers the pack P to the position of the pack take-out conveyor 81. In the third step in (c) of FIG. 16, the pack P is supplied by the pack push-out tool 86 pushing out the pack P to a position of the pack take-out conveyor 81.

Figure 17:
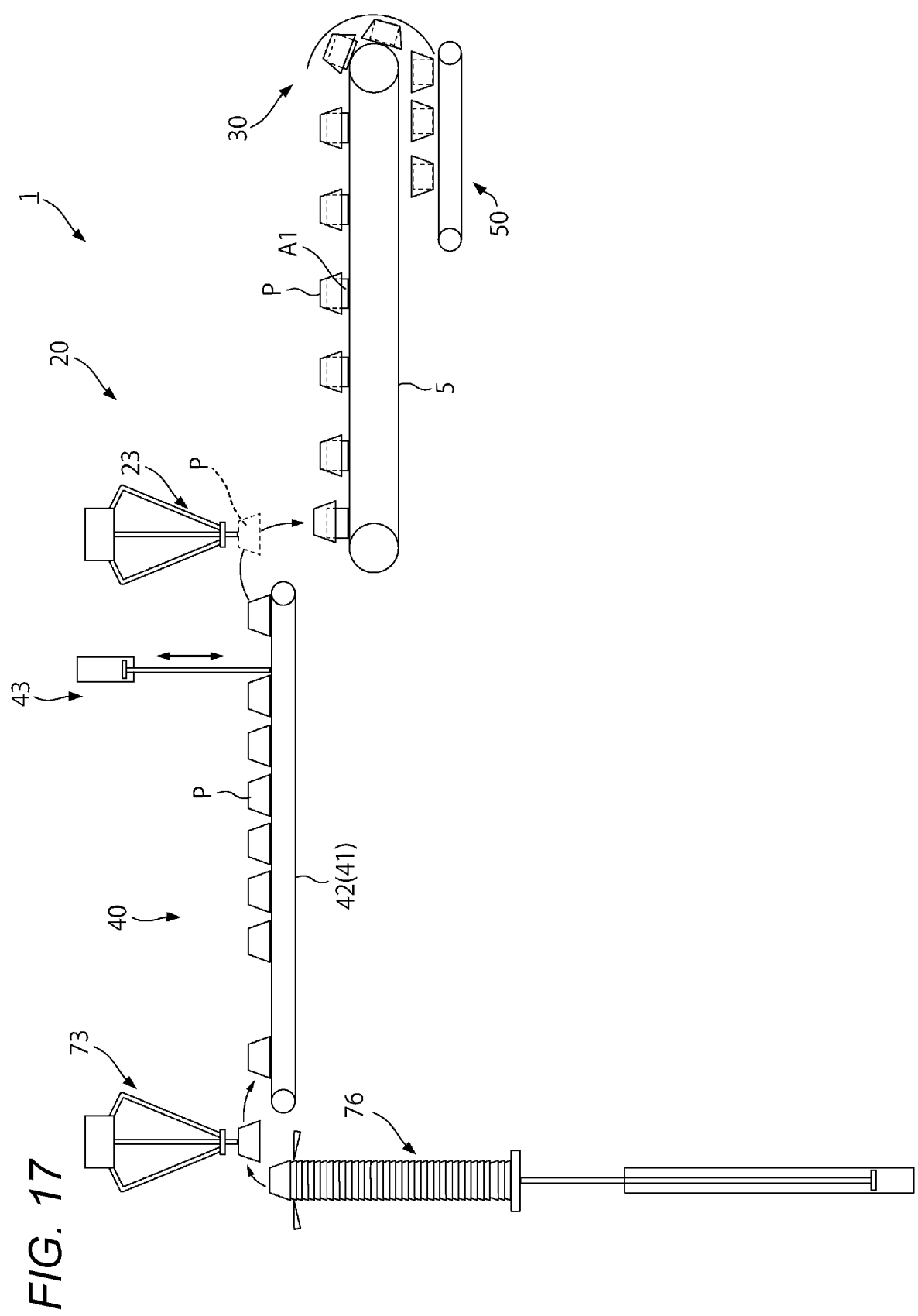
FIG. 17 is an overall side view of a tofu packing device according to an eighth embodiment.

FIG. 17 shows the tofu packing device 1 according to an eighth embodiment. In the present embodiment, the parallel link mechanism 23 of the pack covering device 20 directly grips the pack P from the pack supply conveyor 40 and carries the pack P to the second transfer conveyor 5. The pack supply conveyor 40 is shown as being disposed parallel to a traveling direction of the second transfer conveyor 5 (traveling direction of the tofu) in this figure, but the pack supply conveyor 40 is actually disposed so as to intersect with the traveling direction of the second transfer conveyor 5, more specifically, so as to be perpendicular to the traveling direction of the second transfer conveyor 5, as in other embodiments.

The pack supply magazine 76 according to the present embodiment includes a cylinder mechanism that pushes up a plurality of empty packs P that are stacked linearly and whose openings face downward.

Figure 18:
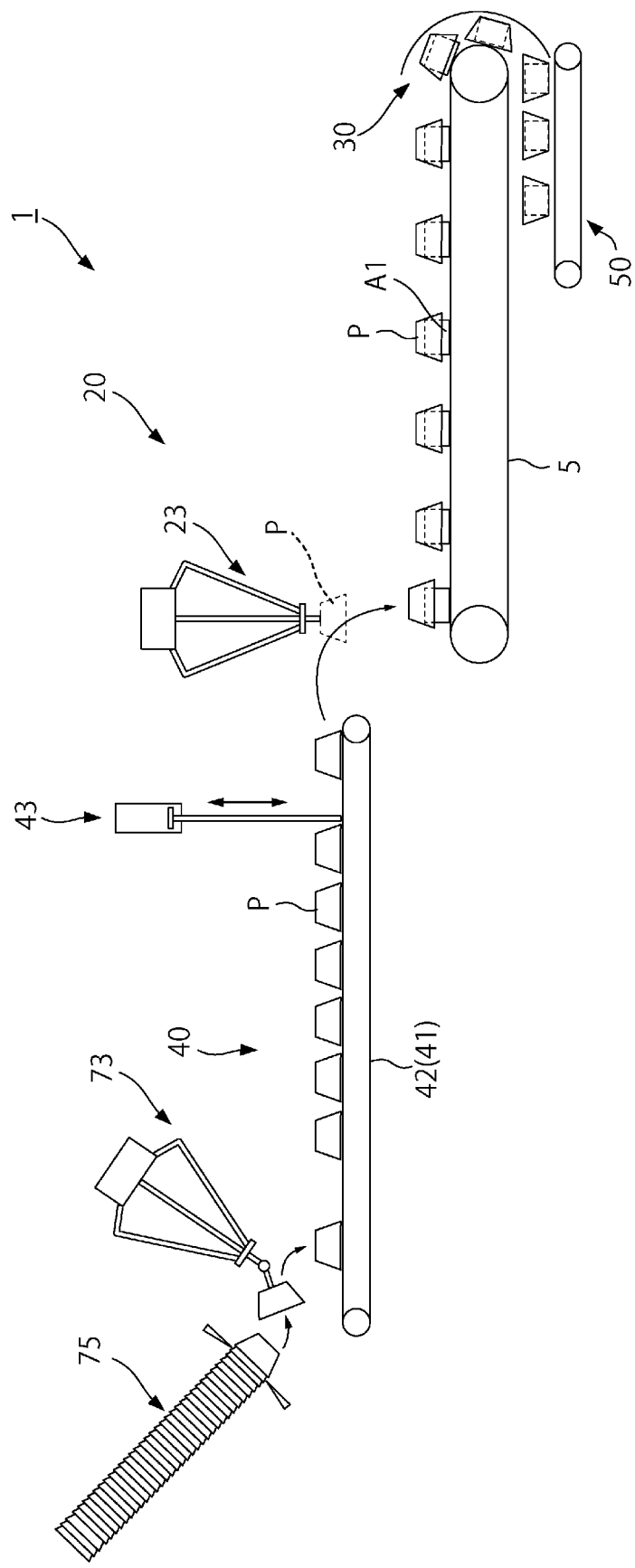
FIG. 18 is an overall side view of a tofu packing device according to a ninth embodiment.

FIG. 18 shows the tofu packing device 1 according to a ninth embodiment. The present embodiment is similar to the eighth embodiment, but the pack supply magazine 75 is used instead of the pack supply magazine 76. The pack supply conveyor 40 is shown as being disposed parallel to a traveling direction of the second transfer conveyor 5 (traveling direction of the tofu) also in this figure, but the pack supply conveyor 40 is actually disposed so as to intersect with the traveling direction of the second transfer conveyor 5, more specifically, so as to be perpendicular to the traveling direction of the second transfer conveyor 5, as in the other embodiments.

Figure 19:
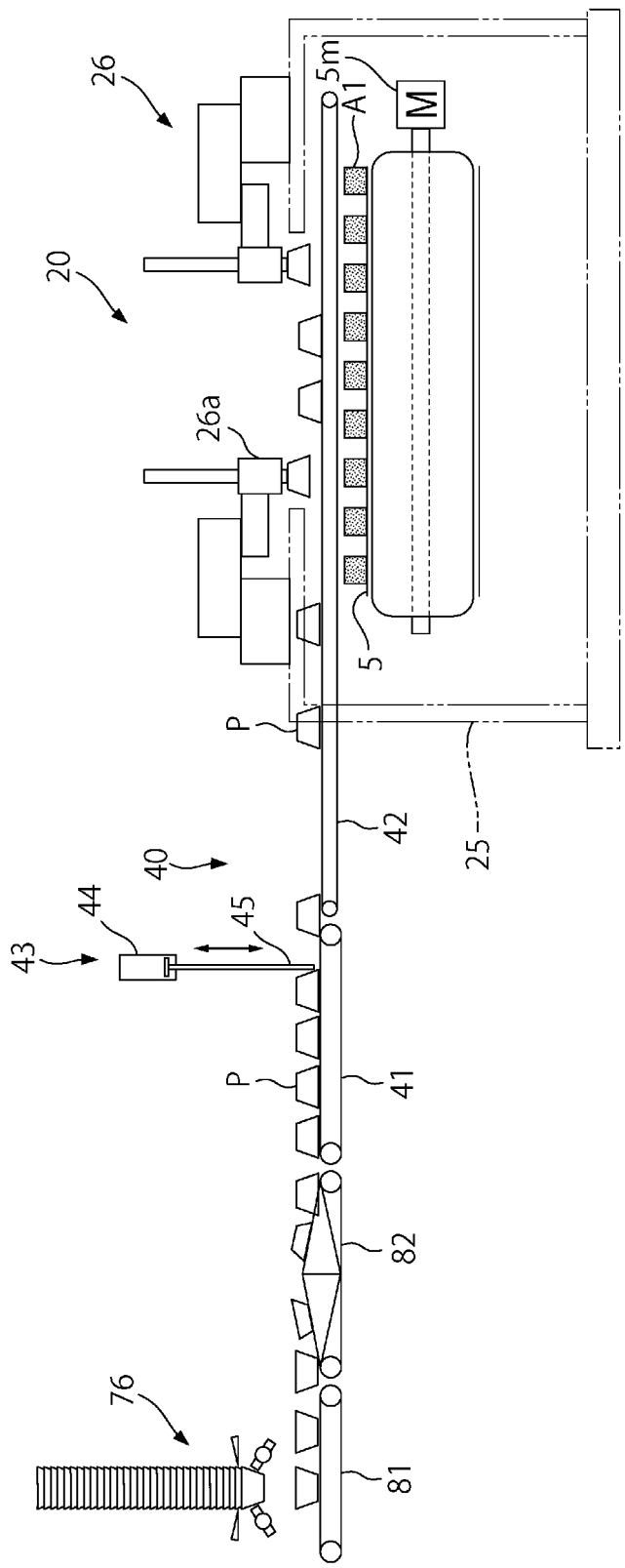
FIG. 19 is a side view of a tofu packing device according to a tenth embodiment at positions of a pack covering device and a pack supply conveyor.
Figure 20:
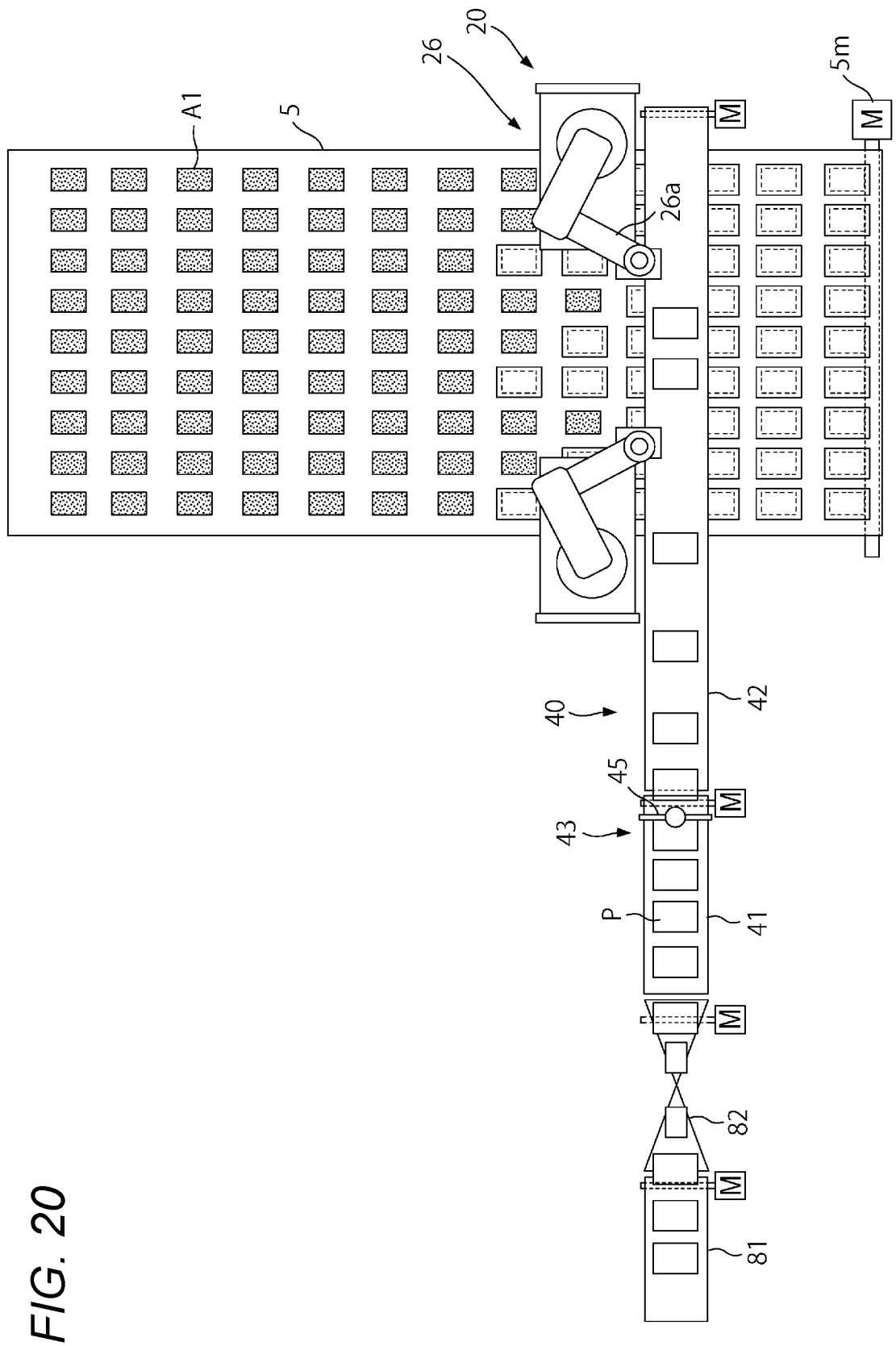
FIG. 20 is a top view of the tofu packing device according to the tenth embodiment including the pack covering device, the pack supply conveyor, and a second transfer conveyor.
Figure 21:
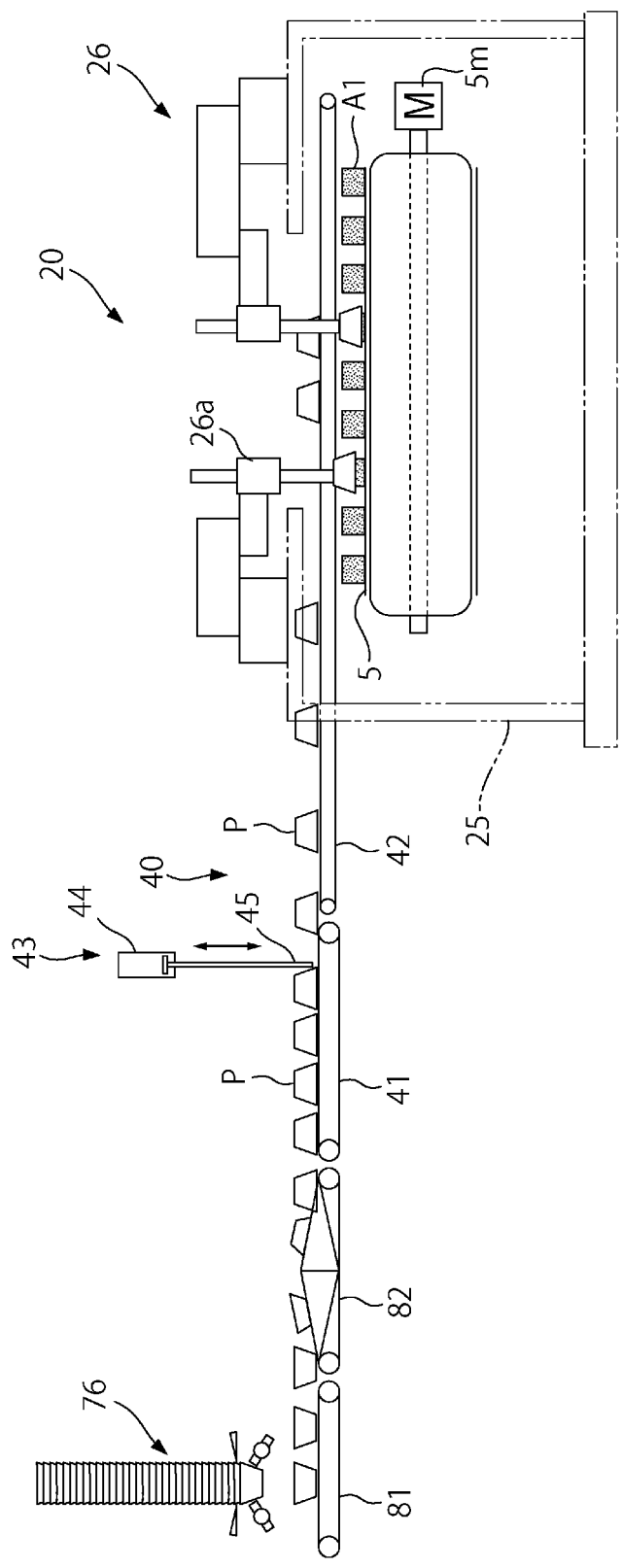
FIG. 21 is a side view of the tofu packing device according to the tenth embodiment at the positions of the pack covering device and the pack supply conveyor.
Figure 22:
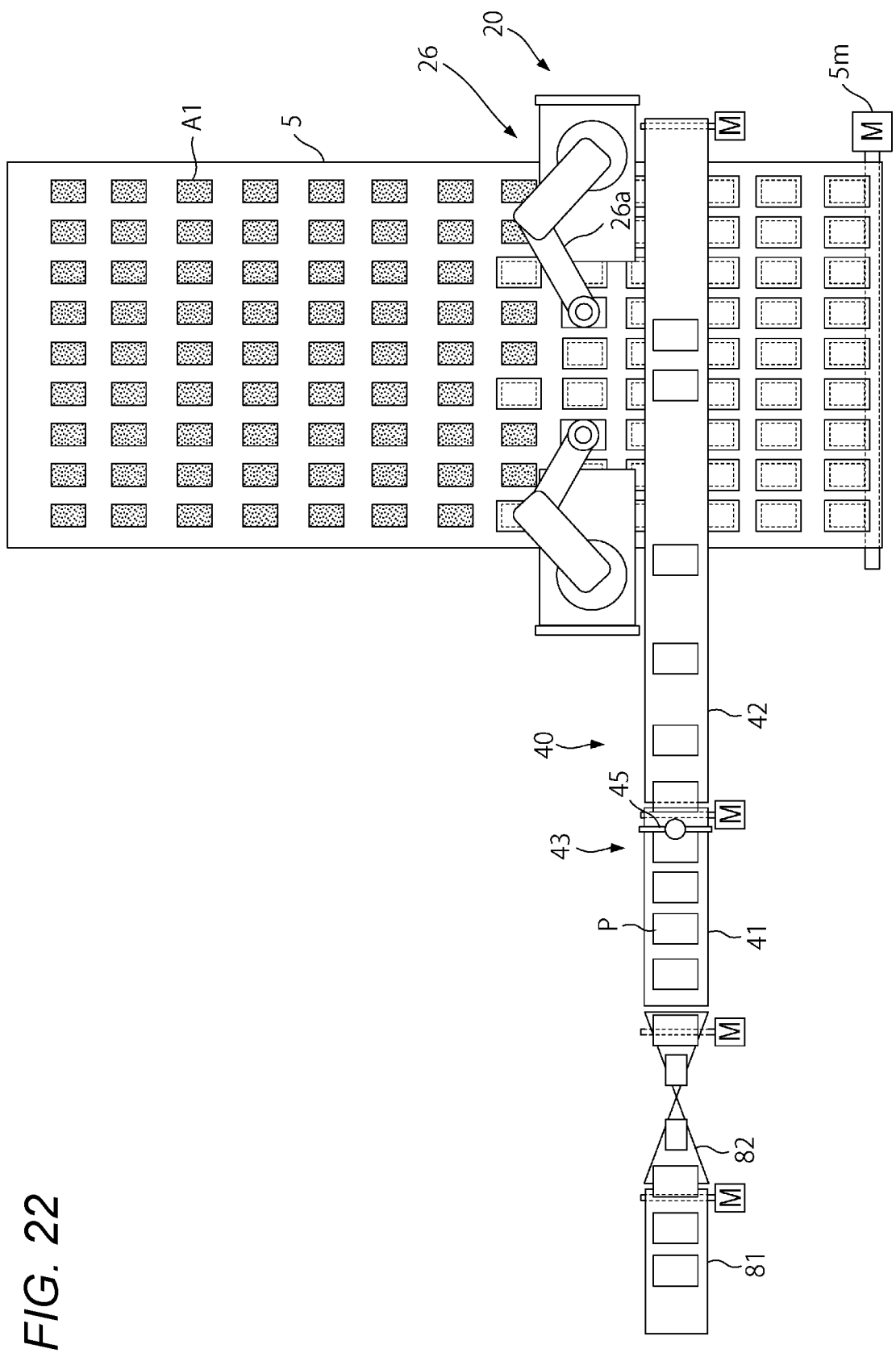
FIG. 22 is a top view of the tofu packing device according to the tenth embodiment including the pack covering device, the pack supply conveyor, and the second transfer conveyor.

FIGS. 19 to 22 show the tofu packing device 1 according to a tenth embodiment. In the present embodiment, instead of the support rail 21 and the parallel link mechanism 23 according to the sixth embodiment, a support rail 25 serving as a base and two SCARA robots 26 are provided. The SCARA robot 26 grips the pack P using an arm 26a. The other functions are the same as those of the fifth embodiment. FIGS. 19 and 20 show a state of a timing at which the SCARA robot 26 grips and lifts the pack P from the second pack conveyor 42, and FIGS. 21 and 22 show a state of a timing at which each cake of tofu A1 is covered with the pack P gripped by the SCARA robot 26.

It should be noted that the present invention is not limited to the embodiments described above, and modifications, improvements, and the like can be made as appropriate. In addition, materials, shapes, sizes, numerical values, forms, numbers, arrangement positions, and the like of components in the embodiments described above are optional and are not limited as long as the present invention can be achieved.

The present application is based on a Japanese Patent Application (Japanese Patent Application No. 2019-236830) filed on Dec. 26, 2019, and the contents thereof are incorporated herein as reference.

REFERENCE SIGNS LIST

1: tofu packing device
3: first transfer conveyor
5: second transfer conveyor (transfer conveyor)
20: pack covering device
21: support rail
22: moving base portion
23: parallel link mechanism
24: image sensor
26: SCARA robot
30: inversion device
40: pack supply device (pack supply conveyor)
41: first pack conveyor
42: second pack conveyor
43: stopper device
73: parallel link mechanism
75: pack supply magazine
76: pack supply magazine
81: pack take-out conveyor
82: inversion conveyor
A: continuous sheet-shaped tofu
A1: one cake unit of tofu
P: pack

The invention claimed is:

1. A tofu packing device comprising:
a cutting device configured to cut continuous sheet-shaped tofu to form a plurality of cakes of tofu;
an aligning device configured to align the plurality of cakes of tofu at predetermined intervals in front, rear, left and right directions on a conveying surface of a transfer conveyor;
a pack covering device configured to cover each of the plurality of cakes of tofu with a pack in a state in which the pack is upside down;
a pack supply device configured to take out the pack from a pack supply magazine holding a plurality of empty packs and continuously supply the pack to the pack covering device by a pack supply conveyor;
an inversion device configured to invert the plurality of cakes of tofu, each of the plurality of cakes of tofu being covered with the pack in the state in which the pack is upside down;
a first camera device configured to capture an image of the plurality of cakes of tofu on the conveying surface of the transfer conveyor; and
a second camera device configured to capture an image of each of the plurality of empty packs taken out from the pack supply magazine and to be placed on the pack supply conveyer,
wherein the pack covering device is configured to adjust an operation for covering the pack with respect to each of the plurality of cakes of tofu based on an image analysis result of the image captured by the first camera device and the image captured by the second camera device.

2. The tofu packing device according to claim 1,
wherein the pack supply device extends up to a position above the transfer conveyor, and is configured to supply the packs to a position where the pack covering device is disposed.

3. The tofu packing device according to claim 1,
wherein the pack supply device is configured to supply the packs along a direction intersecting with a traveling direction of the transfer conveyor.

4. The tofu packing device according to claim 3,
wherein the pack supply device is configured to supply the packs along a direction perpendicular to the traveling direction of the transfer conveyor.

5. The tofu packing device according to claim 1,
wherein the pack supply device comprises:

a first pack conveyor disposed on a lateral side of the transfer conveyor; and a second pack conveyor disposed above the transfer conveyor and configured to supply the packs supplied from the first pack conveyor to the pack covering device.

6. The tofu packing device according to claim 5, wherein the pack supply device further comprises a stopper device configured to temporarily stop traveling of the packs on the first pack conveyor.

7. The tofu packing device according to claim 1, wherein the pack supply device further comprises a pack take-out robot capable of taking out the packs one by one from the pack supply magazine.

8. The tofu packing device according to claim 7, wherein, when all the packs held in a specific pack supply magazine are taken out, the pack take-out robot takes out the packs from a spare pack supply magazine existing within an operation range of the pack take-out robot.

9. The tofu packing device according to claim 1, wherein the pack supply device comprises:

the pack supply magazine configured to hold the plurality of empty packs;

a pack take-out conveyor configured to convey the packs discharged from the pack supply magazine in a state in which openings of the packs face upward; and an inversion conveyor configured to invert the packs conveyed by the pack take-out conveyor with the openings facing upward such that the openings face downward.

10. The tofu packing device according to claim 1, wherein at least one of the pack supply device and the transfer conveyor is IP65 or higher.

* * * * *